United States Patent
Bohannon

(10) Patent No.: US 7,627,572 B2
(45) Date of Patent: Dec. 1, 2009

(54) RULE-BASED DRY RUN METHODOLOGY IN AN INFORMATION MANAGEMENT SYSTEM

(75) Inventor: James John Bohannon, Pleasanton, CA (US)

(73) Assignee: Mypoints.com Inc., San Francisco, CA (US)

( * ) Notice: Subject to any disclaimer, the term of this patent is extended or adjusted under 35 U.S.C. 154(b) by 407 days.

(21) Appl. No.: 11/752,799

(22) Filed: May 23, 2007

(65) Prior Publication Data

US 2008/0275916 A1 Nov. 6, 2008

Related U.S. Application Data

(60) Provisional application No. 60/915,573, filed on May 2, 2007.

(51) Int. Cl.
*G06F 17/30* (2006.01)
(52) U.S. Cl. .................. 707/6; 707/101; 707/104.1; 707/E17.109; 705/14
(58) Field of Classification Search .................. 707/6, 707/101, 104.1, E17.107, E17.109, E17.112; 705/14, 34
See application file for complete search history.

(56) References Cited

U.S. PATENT DOCUMENTS

| | | | |
|---|---|---|---|
| 7,240,022 B1* | 7/2007 | Bistriceanu et al. | 705/14 |
| 7,362,862 B2* | 4/2008 | Schneier et al. | 380/251 |
| 2003/0236748 A1* | 12/2003 | Gressel et al. | 705/41 |
| 2004/0193489 A1* | 9/2004 | Boyd et al. | 705/14 |
| 2006/0202012 A1* | 9/2006 | Grano et al. | 235/379 |
| 2008/0275916 A1* | 11/2008 | Bohannon | 707/200 |

* cited by examiner

*Primary Examiner*—Leslie Wong
(74) *Attorney, Agent, or Firm*—Marshall, Gerstein & Borun LLP

(57) ABSTRACT

A method of processing data in an information gathering system includes receiving a set of candidate data records and attempting to obtain a set of processing rules associated with the set of candidate data records. If the set of processing rules is successfully obtained, the method includes obtaining a set of quality criteria associated with the obtained set of processing rules, applying the set of processing rules and the set of quality criteria to the set of candidate data records to produce a set of quality indicators, and conditionally applying the set of candidate data records to a database associated with the information gathering system based on the set of quality indicators.

37 Claims, 16 Drawing Sheets

FIG. 7

Campaign configuration

- Job ID: 0001 — 572
- Activity/Task: QUESTIONNAIRE / EMAIL / OTHER — 574
- Email Text: New offer from abc.com! — 577
- Number of emails: 10,000 — 576
- Click award: 10 — 578
- Purchase award: 20 per $ — 579

Additional Options — 580

[TARGET MEMBERS] — 582  [EMAIL DETAILS]  [AWARD DETAILS] — 581

570

EXPECTATIONS

- ☐ Default — 590
- ☐ Calculate from historical data — 592

- Expected Delivery Rate: 99.5 % — 594
- Expected Clicks: 10.0 % — 595
- Expected Conversion Rate: 1.5 % — 596

Purchase Amount
- From $ 10.00 — 597
- To $ 50.00 — 598

[MORE]

FIG. 8

| Campaign Cell ID | 0001 |
|---|---|
| Client ID | 0012 |
| Client Name | www.client.com |
| Submit Time | 10/12/07:21.19 |
| ... | |

| Campaign Cell ID | Member ID | Member email | Action id | Amount spent | Transaction ID | Visit ID | Order ID | Timestamp |
|---|---|---|---|---|---|---|---|---|
| 001 | 1000001 | jsmith@xyz.com | | $1233.23 | 122345433 | 000231 | 12345678 | 2/2/07:05:34 |
| 001 | 1000002 | sjones@abc.com | 2 | $14.45 | 235344557 | 000345 | 87654321 | 2/2/07:12:23 |
| 001 | 1002345 | | 2 | $17.24 | 456457876 | 001024 | 22344455 | 2/3/07:15:23 |

RULE-BASED DRY RUN METHODOLOGY IN AN INFORMATION MANAGEMENT SYSTEM

CROSS-REFERENCE TO RELATED APPLICATIONS

This application claims benefit of the following U.S. Provisional Application Ser. No. 60/915,573, entitled "Rule-Based Dry Run Methodology in an Information Management System" filed May 2, 2007, the disclosure of which is hereby expressly incorporated herein by reference.

TECHNICAL FIELD

The following disclosure relates to a large-population information management system and, more particularly, to a method of preventing application of erroneous data to a database associated with an information management system.

BACKGROUND

Computing devices and distributed computer systems are widely used to store and maintain large amounts of data. Computing devices that are primarily responsible for managing data are usually referred to as databases. Databases may also be implemented as software components running on non-specialized computing devices. Additionally, software databases sometimes interact with devices equipped with large amounts of physical memory or may be implemented in a distributed fashion by storing data in a plurality of physical devices. Data is usually added to, modified, or removed from a database by human operators or by software components. Database designers and administrators, software developers, and other database users usually organize data into a finite set of categories based on the characteristics of data stored in the database. In particular, relational databases provide the methodology for organizing data into logical formations, or tables, which consist of records. Records may be further broken down into fields, some of which may additionally serve as logical connections between database tables.

With the increase in computing power, many industries and organizations have come to rely on computerized databases not only for data storage but also for statistical analysis of the stored data and for other automated operations related to the patterns identified in the stored data. As a result, the importance of obtaining data which is accurate and up to date has further increased. Moreover, the growing number of database interfaces has provided more methods of populating and updating databases. Meanwhile, these additional sources of data invariably produce additional sources of errors in the data. With the advent of the World Wide Web, the sources of data that may be stored in the database have become almost limitless, making the issue of data accuracy more relevant than ever before.

Users of the World Wide Web distributed computing environment may freely send and retrieve data across long distances and between remote computing devices. The Web, implemented on the Internet, presents users with documents called "web pages" that may contain information as well as "hyperlinks" which allow the users to select and connect to related web sites. The web pages may be stored on remote computing devices, or servers, as hypertext-encoded files. The servers use Hyper Text Transfer Protocol (HTTP), or other protocols to transfer the encoded files to client users. Many users may remotely access the web sites stored on network-connected computing devices from a personal computer (PC) through a browser application running on the PC. The browser application may act as an interface between user PCs and remote computing devices and may allow the user to view or access data that may reside on any remote computing device connected to the PC through the World Wide Web and browser interface. Typically, the local user PC and the remote computing device may represent a client and a server, respectively. Further, the local user PC or client may access Web data without knowing the source of the data or its physical location and publication of Web data maybe accomplished by simply assigning to data a Uniform Resource Locator (URL) that refers to the local file. To a local client, the Web may appear as a single, coherent data delivery and publishing system in which individual differences between other clients or servers may be hidden.

A system may provide web site proprietors with web site user demographics information and is generally described in U.S. application Ser. No. 09/080,946, "DEMOGRAPHIC INFORMATION GATHERING AND INCENTIVE AWARD SYSTEM AND METHOD" to Bistriceanu et al., the entire disclosure of which is hereby incorporated by reference. Generally, the system may include users, web site proprietors, and an enterprise system hosting a central, web site. The users may register with the central web site and may earn "points" for performing specific on- or off-line tasks in exchange for disclosing their demographic information during registration. The users may then redeem their earned points at participating proprietors for merchandise or services. Generally, the central web site manages the system by performing a number of tasks including: maintaining all user demographic information, tracking user point totals, and awarding points according to specific, proprietor-defined rules.

The system described in the above-referenced application may employ either a centralized or a distributed database to maintain the information related to users, tasks, proprietors, and services. Data may be arrive at the database from a variety of sources, such as users of the system, system administrators, automated processes servicing the system, web site proprietors, and others. Moreover, some data, such as real time updates, may arrive as individual entries and some data may arrive in bulk as part of large files as part of periodic updates. Clearly, while an individual entry containing erroneous or corrupted data may have some negative impact on the operation of the system, storing large amounts of faulty data in the database may have very dire consequences. For example, large amounts of faulty data may cause the system to award too many points to a significant number of users leading to large financial losses or, conversely, to award an insufficient amount points to a significant number of users resulting in low customer satisfaction. Moreover, statistical analysis may be further impaired by taking into account inaccurate data.

Several methods of assessing the quality of data in a database are known in the art. For example, credit card companies typically detect patterns in credit card usage by a particular card holder. In accordance with a method referred to as "velocity checking," credit card companies attempt to detect excessive quantities, such as rates or amounts, for a particular card holder and flag the associated transactions. However, this method of detecting abnormal behavior or erroneous reporting can only be applied to individual members.

On the other hand, a method known as "straightlining" is used in the market research industry to detect fraudulent behavior. Because some survey respondents fill out questionnaires with a made-up or otherwise false data by picking the first answer on the survey, for example, the method of straightlining may be used to detect and discard those surveys that appear dishonest. However, this method is similarly limited because it can be applied on a survey-by-survey basis.

SUMMARY

An information gathering system implemented in a World Wide Web environment includes a method and a corresponding proprietor interface for defining a set of jobs constituting a campaign, a set of job rules defining a manner in which each job maybe processed by the information gathering system, and a set of expectation values for each job and for each campaign. The information gathering system then receives a multi-record file from a proprietor, or batch of data generated internally, obtains one or more threshold values defining the tolerance of the information system to certain types of errors, unexpected. quantities, and similar irregularities, and validates the received files based on the rules and on the expectation values received by a proprietor for the corresponding campaign. In one embodiment, the threshold values are generated automatically by the information gathering system based on the historical data accumulated by the system. In another embodiment, proprietors are allowed, to indicate the threshold values in addition to the campaign rules and the expectation values. In one aspect, the expectation values describe the number of records in a submitted file that are expected to match a certain criteria, such as the percentage of records of record in a file reporting a certain type of transaction. In another aspect, the information gathering system prevents the records submitted in a multi-record file from being applied to the database if one or more threshold values are exceeded. In another aspect, records may be partially accepted for processing depending on the type of threshold value violated by the corresponding multi-record file, whereby some of the information contained in each record is applied to the database while another part of the record is rejected. In one aspect, multi-records are rejected entirely if a condition defined by one or more threshold values has been violated. In another aspect, files are partially accepted, whereby some of the records matching the corresponding expectation values are processed while the rest of the records are rejected.

BRIEF DESCRIPTION OF THE DRAWINGS

FIG. 7 is an exemplary interface provided by a demographic information gathering system during campaign configuration.

FIG. 8 is an exemplary format of a report file submitted to the information gathering system of FIGS. 1-4A.

DETAILED DESCRIPTION

System Overview

Figure 1:
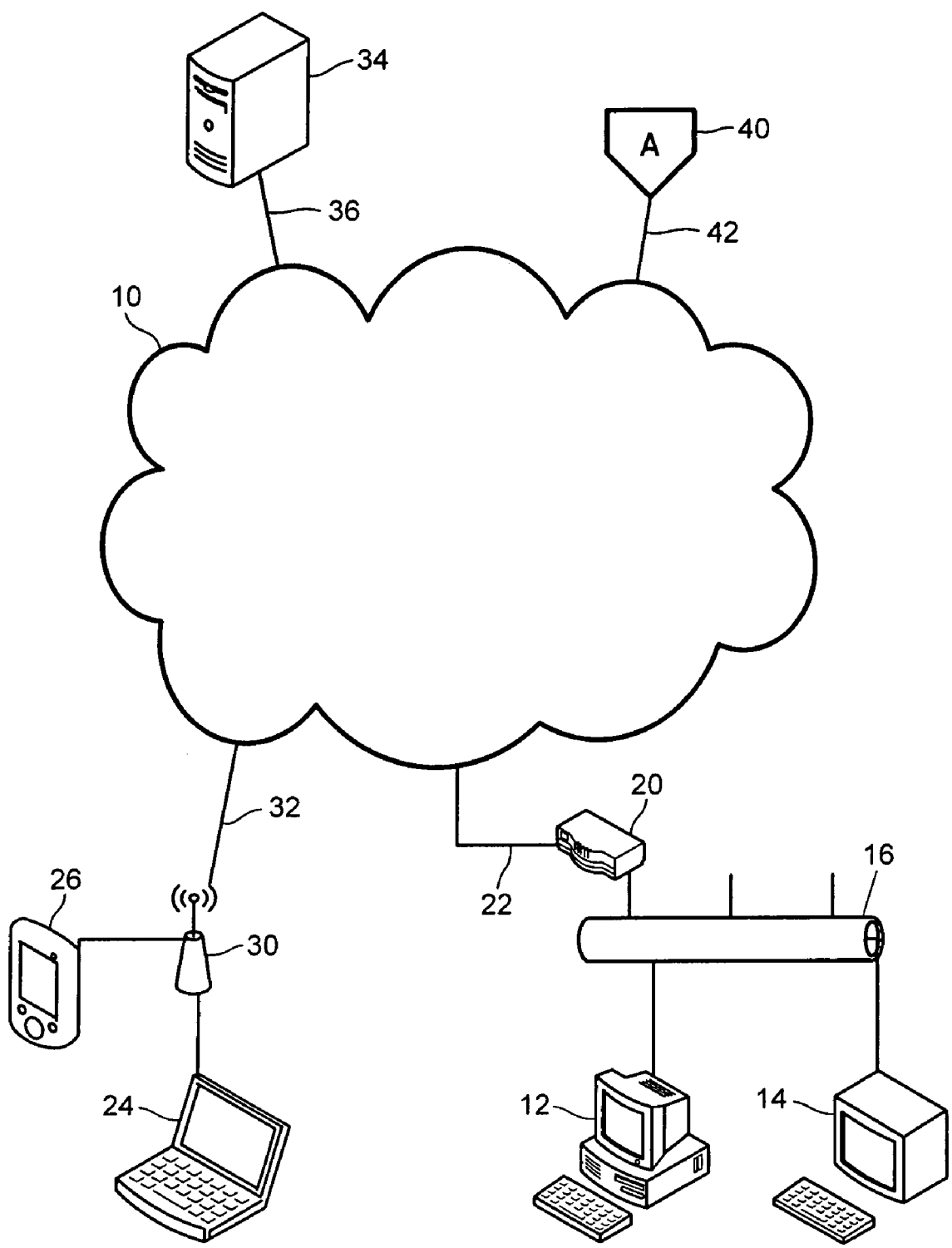
FIG. 1 is a schematic representation of an exemplary demographic information gathering system.
Figure 3:
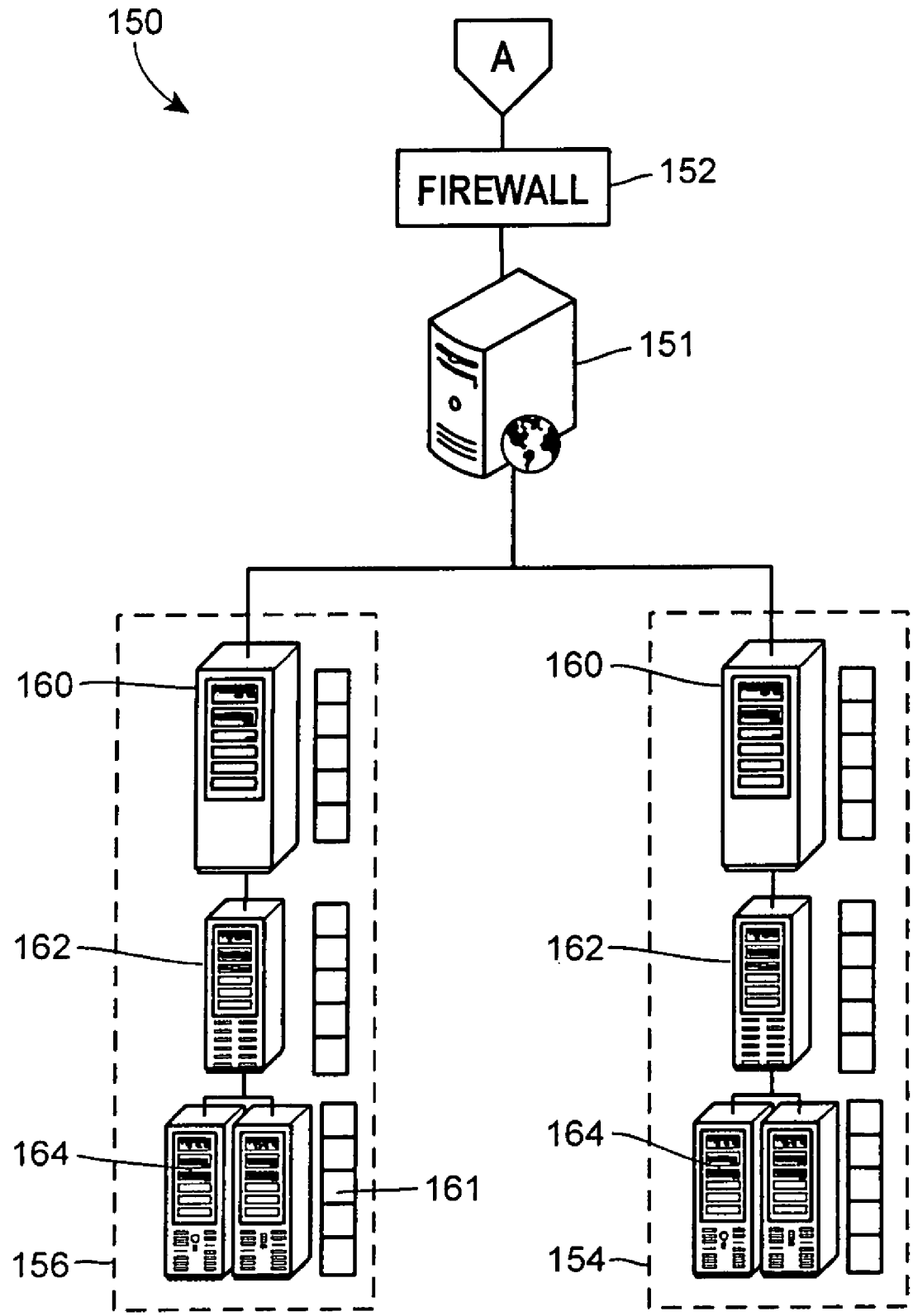
FIG. 3 is a diagram of one example of an enterprise system including two groups of servers, a web server, and a firewall as connected to the network of FIG. 1.
Figure 5:
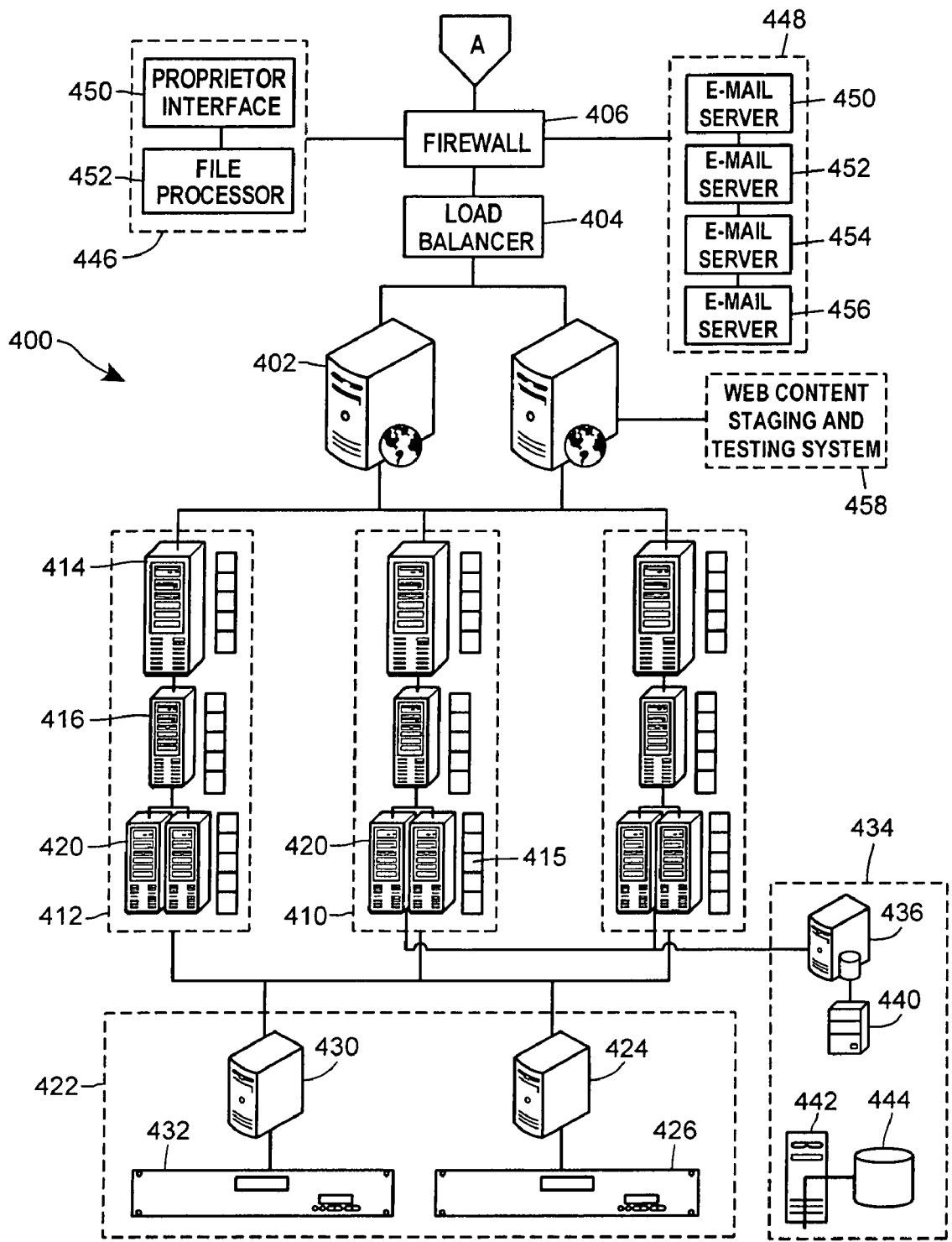
FIG. 5 is another diagram of one example of an enterprise system including a plurality of member server groups, a single administrative server groups, and several components and systems that may enhance system function.

FIG. 1 illustrates an example of a network typical of the World Wide Web. A network 10 may be a virtual private network (VPN), or any other network that allows one or more computers, communication devices, databases, etc., to be communicatively connected to each other. The network 10 may be connected to a PC 12 and a computer terminal 14 via an Ethernet 16 and a router 20, and a land line 22. The network 10 may also be wirelessly connected to a laptop computer 24 and a personal data assistant 26 via a wireless communication station 30 and a wireless link 32. Similarly, a server 34 may be connected to the network 10 using a communication link 36. Also, an enterprise system 40 for awarding points to registered users in exchange for demographic information, as generally illustrated in FIG. 3 or 5, may be connected to the network 10 using another communication link 42. Where the network 10 includes the Internet, data communication may take place over the network 10 via an Internet communication protocol. In operation, the client PC 12 may view or request data from any other computing device connected to the network 10. Further, the PC 12 may send data to any other computing device connected to the network 10.

Figure 2:
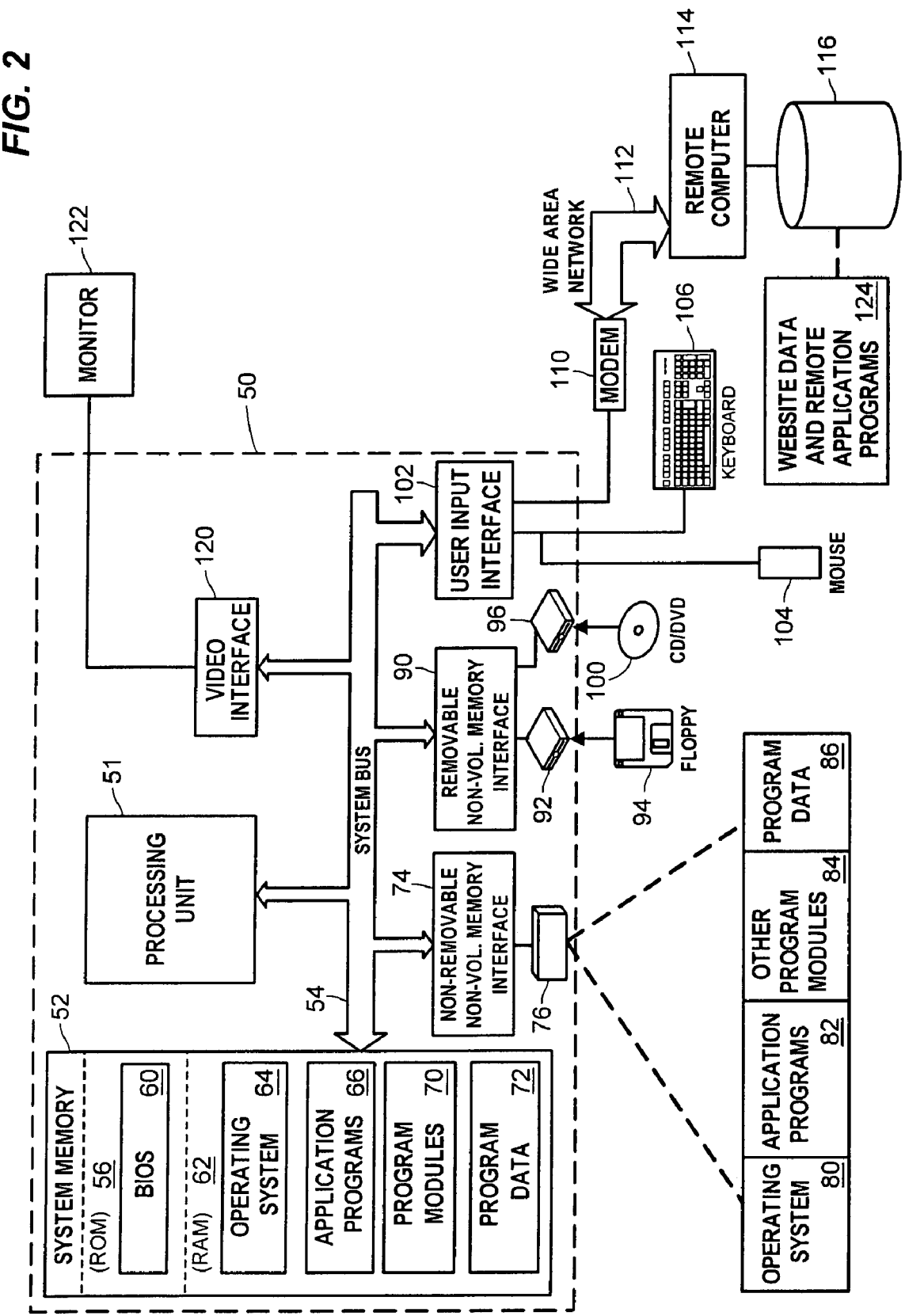
FIG. 2 is a schematic representation of an exemplary personal information record stored by a demographic information gathering system.

FIG. 2 illustrates a typical computing device 50 that may be connected to the network 10 of FIG. 1 and participate in a distributed computing environment such as the World Wide Web. FIG. 2 may also be an example of an appropriate computing system on which the claimed apparatus and claims may be implemented, however. FIG. 2 is only one example of a suitable computing system and is not intended to limit the scope or function of any claim. The claims are operational with many other general or special purpose computing devices such as PCs 12, server computers 34, portable computing devices such as a laptop 24, consumer electronics 26, mainframe computers, or distributed computing environments that include any of the above or similar systems or devices.

With reference to FIG. 2, a system for implementing the steps of the claimed apparatus may include several general computing devices in the form of a computer 50. The computer 50 may include a processing unit, 51, a system memory, 52, and a system bus 54 that couples various system components including the system memory 52 to the processing unit 51. The system bus 54 may include an Industry Standard Architecture (ISA) bus, a Micro Channel Architecture (MCA) bus. Enhanced ISA (EISA) bus, Video Electronics Standards Association (VESA) local bus, a Peripheral Component Interconnect (PCI) bus or a Mezzanine bus, and the Peripheral Component Interconnect Express (PCI-E) bus.

The computer 50 may include an assortment of computer-readable media. Computer-readable media may be any media that may be accessed by the computer 50. By way of example, and not limitation, the media may include both volatile and nonvolatile media, removable and non-removable media. Media may also include computer storage media and communication media. Computer storage media may include volatile and nonvolatile, removable and non-removable media that stores information such as computer-readable instructions, program modules, data structures, or other data. Computer-storage media may include RAM, ROM, EEPROM, or other memory technology, optical storage disks, magnetic storage devices, and any other medium which may be used to store computer-accessible information. Communication media may be computer-readable instructions, data structures, program modules, or other data in a modulated data signal or other transport mechanism. Communication media may include wired media such as a wired network or direct-wired connection, and wireless media such as RF, infrared, and other wireless media.

The system memory 52 may include storage media in the form of volatile and/or non-volatile memory such as ROM 56 and RAM 62. A basic input/output system 60 (BIOS), containing algorithms to transfer information between components within the computer 50, may be stored in ROM 56. Data or program modules that are immediately accessible or are presently in use by the processing unit 51 may be stored in RAM 62. Data normally stored in RAM while the computer 50 is in operation may include an operating system 64, application programs 66, program, modules 70, and program data 72.

The computer 50 may also include other storage media such as a hard disk drive 76 that may read from or write to non-removable, non-volatile magnetic media, a magnetic disk drive 251 that reads from or writes to a removable, non-volatile magnetic disk 94, and an optical disk drive 96 that reads from or writes to a removable, nonvolatile optical disk 100, Other storage media that may be used includes magnetic tape cassettes, flash memory cards, digital versatile disks, digital video tape, solid state RAM, and solid state ROM. The hard disk drive 76 may be connected to the system bus 54 through a non-removable memory interface such as interface 74. A magnetic disk drive 92 and optical disk drive 96 may be connected to the system bus 54 by a removable memory interface, such as interface 90.

The disk drives 92, 96 transfer computer-readable instructions, data structures, program modules, and other data for the computer 50 to different storage media 94, 100 for storage. A hard disk drive 76 may store an operating system 64, application programs 66, other program modules 70, and program data 72. These components may be the same or different from operating system 64, application programs 66, other program modules 70 and program data 72. The components associated with the hard disk drive 76 may be different copies than those associated with RAM 62.

The user may interact with the computer 50 through input devices such as a keyboard 106 or a pointing device 104 (i.e., a mouse). A user input interface 102 may be coupled to the system bus 54 to allow the input devices to communicate with the processing unit 51. A display device such as a monitor 122 may also be connected to the system bus 54 via a video interface 120.

The computer 50 may operate in a networked environment using logical connections to one or more remote computers 114. The remote computer 114 may be a PC 12, a server 34, a router 20, or other common network node as illustrated in FIG. 1. The remote computer 114 typically includes many or all of the previously-described elements regarding the computer 50, even though only a memory storage device 116 is illustrated in FIG. 2. Logical connections between the computer 50 and one or more remote computers 114 may include a wide area network (WAN) 112. A typical WAN is the Internet. When used in a WAN, the computer 50 may include a modem 110 or other means for establishing communications over the WAN. The modem 110 may be connected to the system bus 54 via the user input interface 102, or other mechanism, in a networked environment, program modules depicted relative to the computer 50, may be stored in the remote memory storage device 116. By way of example, and not limitation, FIG. 2 illustrates website data and remote application programs 124 as residing on the memory device 116. As may be appreciated, other means of establishing a communications link between the computer 50 and the remote computer 114 may be used.

As previously described, the system may award users with redeemable points for many reasons, such as, in exchange for collecting and releasing user demographic information to proprietors or clients and for users taking any action associated with a "campaign," or set of rules negotiated by the proprietor. As used herein, a user or member may be any person, apparatus, method, or the like that employs a computing device 50 to access the system to earn redeemable points by completing proprietor-defined tasks in exchange for submitting and releasing demographic information to the system.

Further, as used herein, "demographic information" may be broadly construed and may include any kind of member descriptive data, any activity associated with a member, or any transaction associated with a member. Demographic information may be gathered by the system upon user registration in the form of a questionnaire designed to solicit various demographics data of interest to the proprietors. The questionnaire may be in the form of a website page or any other format able to collect demographics information from the user. Users may register in a variety of ways including direct registration at the central web site hosted by the enterprise system, registration through web site proprietors, a web based "refer-a-friend" program, third-party direct mailing, or other partner relationships. A user may need only to register with the system once. However, the user may earn additional points by completing future, supplementary questionnaires. Typical examples of information gathered by the questionnaires may be the user's age, income, occupation, etc. Further, the system may award a user for specific actions such as viewing web-based content, purchasing goods or services through a system-sponsored website, a proprietor's website, a proprietor's brick-and-mortar facility, or any other action associated with the system. The demographics information, to include but not limited to information gathered by questionnaire or records of any user action taken at the suggestion of or related to the system and a proprietor campaign, may be aggregated into a unique user profile. Once the user creates a profile, all future user activity within the system may be uniquely associated with the user's profile, A user may participate in the system by using a network 10 and a PC 12.

Further, as used herein, a proprietor, merchant or client may be any entity, corporation, web site manager, business owner, or the like that coordinates with the system by submitting a set of proprietor-defined award rules or tasks that a user may complete to earn redeemable points. The proprietor may also purchase user demographic information from the system and provide product price reductions or other benefits to users in exchange for user demographic information, or may complete any combination, of these functions. This set of proprietor-defined rules or tasks may be called a "campaign." Each campaign may further include a template for e-mails to be sent by the system to targeted users. A proprietor may compensate the system for receiving the users' demographic information in a number of ways including: monthly sponsorship fees for the system displaying their offers on the central web site; per action fees when users follow specific actions provided to the system; per click fees for users clicking on hyperlinks provided in targeted e-mails advertising proprietor services or products and directing the user to a proprietor Web page; per e-mail delivery fees; advertisement placement within "newsletter" e-mails that the system may send to all system-registered users; and other fee combinations including indirect, agency relationships between proprietors and the system. Also, the system may compensate a proprietor for soliciting new memberships. The system may further automate billing clients based on a set billing rules within each campaign. The billing rules may be associated with award rules and user activity. For example, within a particular campaign, an award campaign rule may award a member two hundred points for making a single purchase with a proprietor. The campaign may also include a billing rule indicating that the proprietor may be billed at five percent of all purchases made by the member, even though only the first transaction awarded points. In another aspect, the system or an operator of the system may define point award rules for a particular campaign in view of the billing rules supplied by a proprietor or merchant. Shifting the responsibility to specify point award rules from a proprietor to an operator of the system may be preferable because the distribution of points may be the financial liability of the operators of the system. It is also possible that the financial liability is effectively borne by the operators by charging back the cost of the points to the merchants or clients, either up front (so that the merchants purchase the points ahead of time, and then "spend" them on campaigns by giving them out to members as incentives), or on an "as used" basis (so that they become liable for whatever points are awarded by the system, as those payments occur), or even on an "as redeemed" basis, where they might only pay for points that are actually spent by members later.

A good reason for the system operator to maintain the responsibility for awarding points is that the system operator may have more experience and knowledge in setting appropriate point award levels to induce the desired level of response from members so as to maximize profits. Also, a proprietor may customize its campaign to award a user points in a variety of methods. For example, a proprietor may choose the number of points to be awarded to users, may specify activities or questions that must be completed by the user before points are awarded, or may limit the frequency at which users can be awarded points for visiting the site. A proprietor may also dictate different user questionnaires during the registration process or may provide an additional questionnaire as a user task to be completed by the user to earn additional points. Additionally, a proprietor, merchant, or client may coordinate with the operator of the system to send out newsletters and surveys. Further, a merchant may also be a club or a gaming service, in which case a merchant may coordinate with the system to track membership, gaming activity, and other patterns. It is also possible for an agency to represent one or more merchants and coordinate campaigns on their behalf.

The system may also provide additional processing rules to complement a set of proprietor-defined rules. For example, there may be formatting rules or business rules imposed by the system that may not be provided by a proprietor, merchant, or another party authorized to coordinate campaigns. Moreover, the system may create an internal campaign for its own marketing purposes, in which case all corresponding processing rules may come from the system.

Also, as used herein, the system may refer generally to the method or apparatus that coordinates user and proprietor functions by collecting user demographic information, awarding redeemable points to the users, tracking points for the users or proprietors, aggregating statistical information concerning user activity and the demographic information, maintaining the proper function of all user and proprietor activity, providing statistical and demographic information to the proprietors, sending targeted e-mail, to the users, and executing any other management or coordination functions. The targeted e-mails may contain hyperlinks that direct users to proprietor offers that may award or redeem points to a specific user account. The system may be a collection of devices, typically general purpose computing devices 50, servers, 34, and data stores connected to and in communication with a user PC 12 through a network 10.

A system for collecting demographics information in exchange for awarding redeemable points may include a variety of structures and components as generally described in relation to FIGS. 3 and 5. Therefore, the system configurations described in relation to FIGS. 3 and 5 may include any combination of elements described in relation to each figure.

With reference to FIG. 3, the system 150 may include an architecture that is N-tier with a web server 151 in communication with a system firewall 152 through which a user may access a website hosted on the web server 151 by the system 150. The system firewall 152 may provide a secure, high-speed connection to a computer network such as the Internet as illustrated in FIG. 1. The web server 151 may face the users and communicate with a number of server groups or "silos" such as silo 154 and silo 156. A silo may be a conceptual collection of servers that work together through an application interface. Each silo may include, for example, an application server 160 that may execute a system application program 161.

With reference to FIG. 2 and FIG. 3, a system application program 161 running on the application server 160 may be an application program 66 or a remote application program 124 and may perform any coordination, transformation, or update process on the data entering or exiting a master data server 162. Further, a system application program 161 may execute on any general computing device 50 or any system 150 component. A system application program 161 running on the application server 160 may include, for example, any combination of an e-mail, engine, a query engine, a validation engine, a crypto engine, an award engine, or a transaction engine.

Returning to FIG. 3, the application server 160 may communicate between the web server 151 and a master data server 162 to pass data from the web server 151 or to pass data generated by the system application programs 161 to the master data server 162 or any other system 150 element. The master data server 162 may include a portion of the total system 150 data, consisting of, for example, user demographic data, campaign data, and any other data used by the system 150. In turn, the master data server 162 may communicate with replication data servers 164. The replication data servers 164 may include a duplicate copy of the user profile data assigned to the silos 154, 156.

The system capacity is expanded simply by adding more silos 154, 156. The silos 154, 156 may also provide specialized functions within the system 300. For example, the silo 156 may be an administrative silo 156. The administrative silo 156 may be used by the system 150 to manage system information, campaign information, or any other information not related to the user profiles. The administrative silo 156 may also include a lookup table that may direct any data queries to the correct member silo 154. The administrative silo 156 may combine several different functions together, or it may be split apart into separate silos. For example, one administrative silo may contain campaign information while a separate administrative silo may contain a lookup table to direct any data queries to the correct member silo 154. Alternatively, there could be a third administrative silo which manages, for example, inventory information for redemptions. Thus, the administrative functions need not be confined to a single administrative silo. It should be noted that separating some functions into multiple administrative silos may increase the scalability of the system as a whole.

The member silo may hold the system 150 member information. The member information may include, for example, the user profile, demographics data, transactions, or point balances. As illustrated in FIG. 3, a system comprising one member silo 154 may hold approximately 100% of the total system 150 user information. Upon registration, a member's information, may be stored in the member silo 154. The silo containing the member's registration data may be called the member's "home silo." Each member's information may be kept in the member's "home silo," and may remain in the home silo unless more member silos are added to the system 150.

Figure 4:
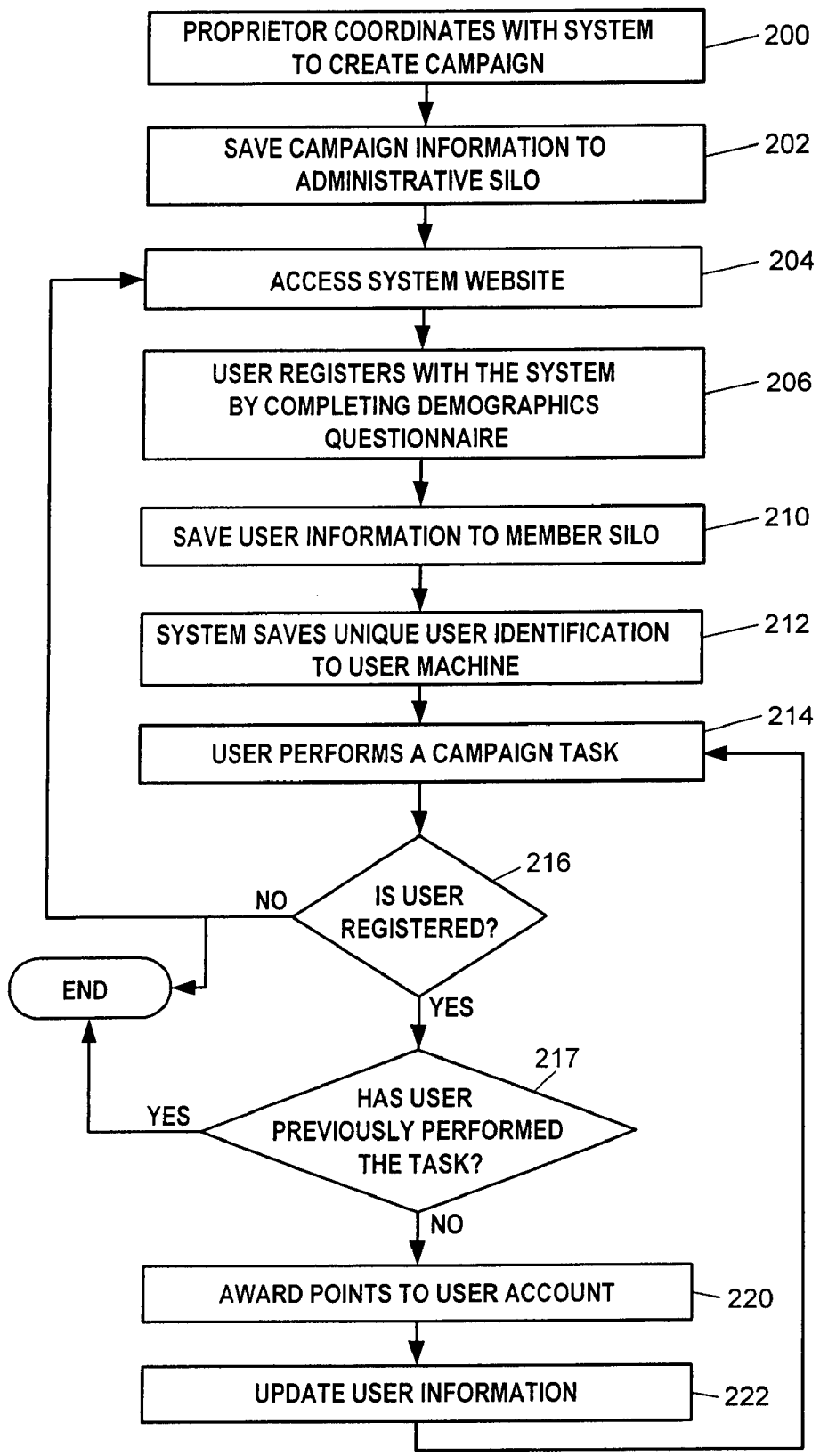
FIG. 4 is a flowchart describing a method of one example of using the system of FIG. 3 to award points in exchange for demographics information.

With reference to FIG. 1, FIG. 3, and FIG. 4, a method employing the enterprise system 300 may provide a user with a number of redeemable points for the user's submission of demographic information and participation in a variety of ecommerce related activities, including making purchases from proprietors. The user may then redeem their points for products and services from the participating proprietors such as retailers, theaters, restaurants, airlines, and hotels, among others. At step 200, a proprietor may coordinate with the system 150 to create a campaign For example, the proprietor may request information from the system 150 to target a specific demographic variable such as age, gender, income, or job. At step 202, the campaign information may be distributed to the silos 154, 156 and distributed across all system master data servers 162. At step 204, a user may login to the system 150 using a general purpose personal computer (PC) 12 connected to a network 10 such as the Internet.

As previously described, at step 206, the user may register with the system 150 by accessing a web site hosted by the system 150 at the web server 151. During registration, the user may complete a demographics questionnaire in the form of a web site or other electronic document. The demographics questionnaire may include various questions concerning the user's background including, for example, the user's age, sex, zip code, job title, or marital status. The system, 150 may collect the demographics data in a variety of formats including free form text, drop down menu selections, or Boolean values.

At step 210, the user's registration information and demographic data may be saved to a member silo 154. At step 212, the system may save a unique user identification to the users PC 105. The unique user identification may be used by the system to associate proprietor campaign tasks and user actions to award points. The unique user identification may be encrypted in the form of a "cookie" associated with the user's browser that may be used to associate the user with the registration information stored on the administrative silo 156.

Further, the system may assign a 64-bit random number to each user upon registration. Because of the extremely low statistical probability of assigning identical 64-bit random numbers to more than one member upon registration, the system 150 need not verify that the random number has been previously assigned. The random user identification assignment may allow the system 150 to more easily select random user demographic information for analysis. Particularly, because the numbers are randomly assigned, any set of records associated with a sequential selection of the random user identifier may be very unlikely to overlap with any other set chosen by the random number. Further, because the random numbers are only used for choosing a random set of members for statistical analysis, a small number of users with identical random numbers will not distort the results. Therefore, because the probability of the system 150 assigning identical 64-bit random numbers is very small, and a few identical numbers will have very little effect on statistical analysis, it may be unnecessary to ensure that a random number has not been previously assigned.

At step 214, the user may perform any of the tasks or actions specified in the proprietor's campaign stored on the administrative silo 156 to cam redeemable points. For example, a campaign task may be visiting the proprietor's web site or responding to a system 150 generated e-mail.

Each proprietor web site may include a visual cue that the web site is a member of the points-awarding program. The visual cue may include a hyperlink pointing to the web server 151. The hyperlink may include a code called an "cell identification" that may optionally be encrypted and may associate the user's selection of the hyperlink with a campaign task saved on the administrative silo 156. Further, the cell identification may provide information associated with all campaign rules. A user may also receive and select hyperlinks associated with a proprietor's campaign in an e-mail message generated by an e-mail engine running as a system application program 161 on the replication server 164.

The e-mail engine could alternatively be run on the application server 160. However, to increase efficiency, the e-mail engine is run on one or more of the replication servers 164 on each member silo 154. In this way, the e-mail engine communicates locally with the database, avoiding network traffic and also avoiding additional load on the application server 160 which is servicing member requests in real-time. This is possible because the e-mail engine is able to work with a replicated copy of the member information. This provides for a great deal of scalability, as additional replication servers 164 could be added. For example, the replication servers 164 could be increased from two to four so that more than one e-mail engine is running for a given member silo 154.

At step 214, the administrative silo 156 and the application server 160 may validate the user's registration with the award program by comparing the user's cookie file with the registration information stored on the administrative silo 156. The validation, process may be performed by a validation engine running as a system application program 161 on the application server 160. If the information received by the application server 315 is encrypted, a crypto engine running as a system application program 161 on the application server 160 may decrypt the information. If the user is not registered, at step 216, the process may terminate or, alternatively, the user may be directed to the system registration web site at step 204. If the user is validly registered, the system 150 may proceed to step 217.

At step 217, the validation engine may determine if the user has previously completed the campaign task associated with step 214. As described above, awarding points may be conditional and defined by the proprietor campaign rules. The campaign tasks and rules may be defined by the proprietor and stored on the administrative silo 156 or distributed across all system 150 silos 154, 156. The tasks and rules may be indexed on the administrative silo 156 by the cell identification. Using the cell identification, the validation engine may determine that a particular cell identification has been previously used, also indicating that the user has previously performed the task and that the user is ineligible for additional points. If the user has previously performed the task, the system 150 may terminate or direct the user to perform a different task. If the user has not yet performed the task, the system may proceed to step 220.

At step 220, if the user is validly registered and has not yet performed the present campaign task, a transaction engine running as a system application program 161 on the application server 160 may award a predetermined number of points to the user's account saved on the member's home silo 154 by associating the campaign task, cell identification, and point quantity with the unique user identification. It should be noted that this step is optional, as are many of the steps in FIG. 4. The system could be configured to award points or perform actions in numerous alternative ways, such as, for example, once, daily, unlimited, other, etc. In other words, the system may be configured to keep track of whether a user has performed a required task before, and whether additional, performances of the task could earn additional points. It is also noted that the system might do things other than award points, such as, for example, directly awarding something else of value, such as a gift card, updating a member's profile information, sending a message to the member, sending a message to a client about the member, changing the member's account status, or numerous other things. One of ordinary skill in the art will readily appreciate that there are various ways of paginating data and the system could be configured to do any of them.

At step 222, the transaction engine running as a system application program 161 on the application server 160 may update transaction information associated with the user at the member's home silo 154. Transaction information may later be used by the system 150 to develop demographic information and statistics associated with, the user actions to provide to the proprietors. Therefore, upon visiting the proprietor site, the system 150 may automatically award points to the registered user without requiring the user to leave the proprietor web site. The system 150 may be distributed across multiple participating web sites and may operate without the knowledge of the user. Optionally, the proprietor's web sites may determine whether a web site visitor is one of the participating users.

The system 150 may also provide hyperlinks to redemption sites at which the users may convert earned points into products or services. The hyperlinks may be embedded in e-mails generated by the e-mail engine system application program 161. Further, the hyperlinks may point to redemption web sites hosted by the system 150 or on hosts at any other proprietor-designated site. The system 150 may automatically accept redemption orders, place purchase orders with vendors for the requested product or service, and may direct the proprietor or vendor to deliver the redeemed products to the user. The points may be automatically deducted from the user's account.

The system 150 may also develop demographic information and statistics to provide for the proprietors. The system 150 may associate the user demographic information with the user's actions associated with the proprietor or any other web site. For example, the percentage of the males visiting a particular web site or web pages may be calculated by looking at each participating visitor in the member silo 154, checking a field in the member silo 154 for each member's sex, and tabulating the results.

Tracking User Activity

Figure 4A:
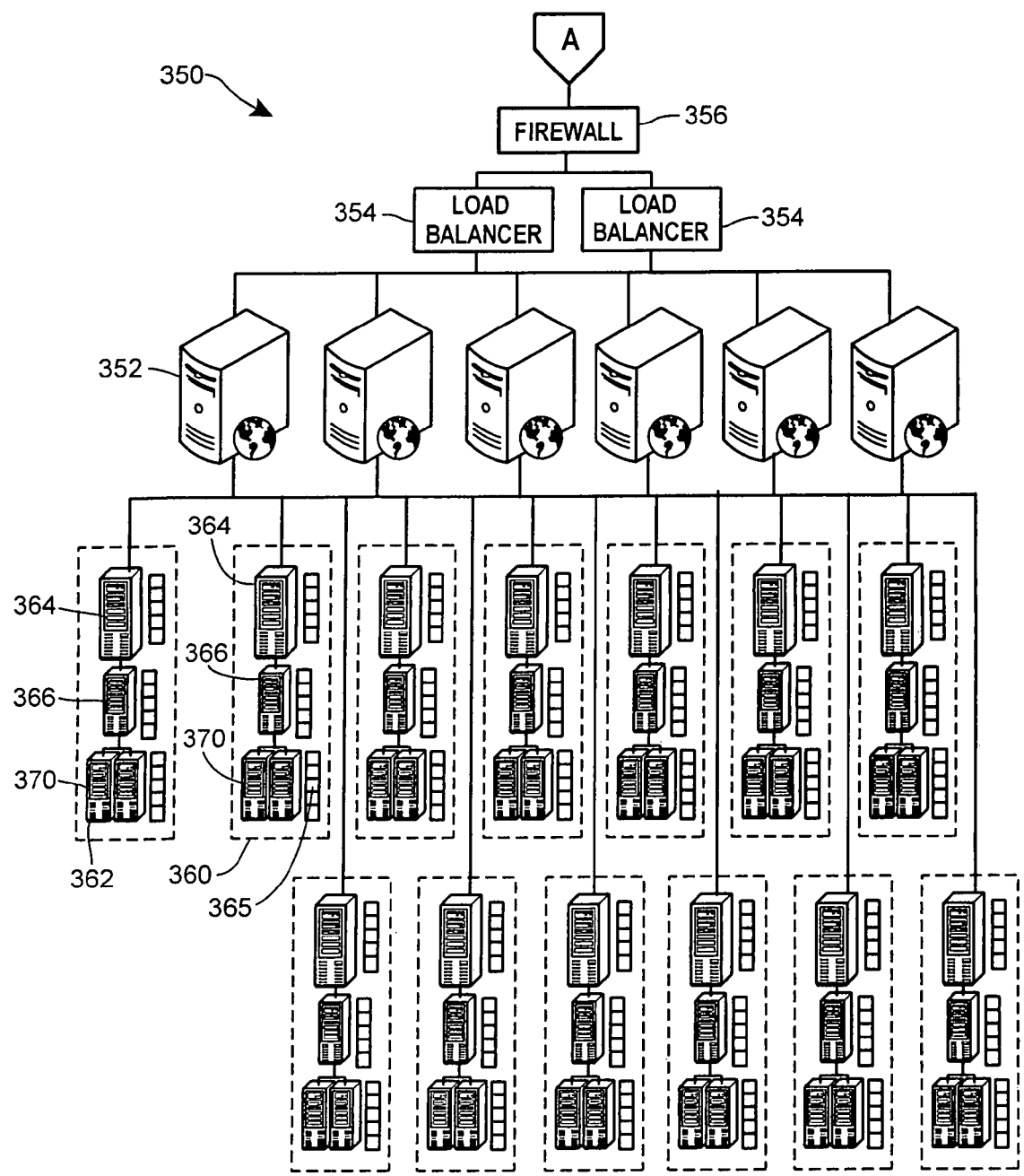
FIG. 4A is another diagram of one example of an enterprise system including twelve member server groups and a single administrative server group.

Referring to FIG. 4A, activity data is continuously received by one or more of the member silos 360 in the enterprise system 350. Various activity parameters may be derived from the activity data, and counts may be maintained for each of the activity parameters. The activity parameters are counted in the memory of the application servers 364 of each of the member silos 360 where the aggregate counts are periodically flushed to the master data server 366, and replicated to the administrative silo 362 when updated counts are available. The administrative silo 362 combines the counts from the various member silos 360 and replicates the combined counts back to the member silos 360 so that every part of the distributed system has a total aggregate system-wide count with only a slight delay (e.g., a few seconds or minutes). This configuration provides scalability to a large number of different "real-time aggregates," allowing for different classes of events to be counted efficiently and the performance thereof to be monitored in real-time (e.g., accurate to within less than a minute). For example, the real-time aggregates may provide an efficient way for the web servers 352 and/or the load balancers 354 to determine the relative utilization of each member silo 360, because each member silo 360 is aware of both its own rate of activity (e.g., the number of activities per minute, the number of activities per day, the number of members, etc.) and the rate of activity system-wide. That is, each member silo 360 may determine, locally, whether its rate of activity is below average or above average and provide such information to the web servers 352 and/or the load balancers 354. A member silo 360 may thereby indicate its ability, or lack thereof, to take on additional loads (e.g., new members, etc.) because of its known utilization in relation to system-wide utilization of other member silos 360.

Referring again to FIG. 4A, a member silo 360 may receive activity data based upon any activities which may be measured by the system (block 502). For example, the activity may relate to a campaign, such as a campaign for offers to members, campaigns to acquire members, marketing activity, emails, errors, or any kind of system activity, business activity, or member activity on the system. The activity data may relate to a member action in connection with the campaign, such as reading an email, signing up for a service, etc. The activity data may be received by the system at a high rate and received by each member silo 360.

Various activity parameters may be derived from the activity data (block 504), which may be generated from the activities on the system. Examples of various activity parameters may include, but are not limited to, a click on an Internet link, points awarded, a dollar amount, a registered member, a unit of measurement, an email sent, an email read, an email bounce, an error occurrence, an error type, or any activity parameter which may be a useful measurement of system activity, business activity, or member activity. Within a particular campaign, a large number of activity parameters may be created, due to a multiplicative nature of the activity parameters. For example, in a marketing offer, there may be a set of activity parameters for each offer and there may be many offers. For instance, if 10 activity parameters are tracked for each offer (e.g., click-throughs, conversions, sign-ups, points awarded, revenue generated, etc.) and there are 500 offers, there are 5000 total activity parameters to be tracked. Due to the distributed nature of the system, each of the member silos may receive the activity data related to any one campaign.

In order to track an activity parameter, an aggregate count of each activity parameter may be maintained and stored in smaller memory portions of the application server 364 memory (block 506). The smaller memory portion of the application server 364 may be called a "bucket." As such, each aggregate count or aggregate type is allocated a memory portion or "bucket," where the aggregate type relates to an aggregated count of an activity parameter and the memory portion or "bucket" maintains the aggregate count data resulting from the aggregated count of the activity parameter. In the memory, there could be a very large number of aggregate types, for example thousands or hundreds of thousands, due to the number of campaigns at any particular time, each having various activity parameters being tracked to monitor the performance of the campaign. For each aggregate type, different counts may be maintained, such as daily, monthly, total since inception or any other choice of time horizon. Accordingly, an aggregate type may be any kind of desired count of any time horizon, with separate memory portions or "buckets" maintained for each time horizon. Examples of aggregate types may correspond with the activity parameters, such as the number of click-through activities for a marketing campaign, the number of points awarded under a marketing campaign, the number of clicks on an Internet link, the number of members who visited a web site, the total dollars in revenue earned, the total bounties payable under a contract, a unit of measurement, etc. The increments for each count may be individual events or any other kind of numeric value (e.g., dollars/cents, points, pounds, gallons, etc.), and may be either positive or negative.

With reference to FIG. 5, the system 400 may also include several components that may complement the awarding of points as previously described. Further, the components may also be added to any of the systems 150, 250, 350 as previously described. As described above, the system 400 may include a distributed architecture that is N-tier with web servers 402 that may communicate with a load balancer element 404, wherein the load balancer element 404 communicates with a system firewall 406 and the web servers 402. The load balancer 404 may randomly distribute all data entering the system 400 through the firewall 406 across the web servers 402. The load balancer's 404 random distribution of data may reduce data latency through the system 400. The load balancer element 404 may include an application executing on a general purpose computer 50 or on any device associated with the system 400 as either software or hardware.

The system firewall 406 may provide a secure, high-speed connection to a computer network such as the Internet as illustrated in FIG. 1. The web server 402 may face the users and communicate with a number of silos 410, 412. A silo 410, 412 may be a conceptual collection of servers that work together through an application interface. Each silo 410, 412 may include an application server 414 executing a system application program 415, wherein the application server 414 may communicate between the web server 402 and a master data server 416, and the master data server 416 may communicate with replication data servers 420. A system application program 415 running on the application server 414 may perform any coordination, transformation, or update process on the data entering or exiting the master data server 416. Further, a system application program 415 may execute on any general computing device 50 in communication with the master data server 416. A system application program 415 running on the application server 414 may include, for example, any combination of an e-mail engine, a query engine, a validation engine, a crypto engine, an award engine, or a transaction engine. The replication data servers 420 may include a duplicate copy of the user profile data assigned to a silo 410, 412.

The silos 410, 412 may provide simple system expandability by providing more silos 410, 412 to the system. The silos 410, 412 may also provide specialized functions within the system 400. For example, the silos 410, 412 may include an administrative silo 412 and member silos 410. The administrative silo 412 may be used by the system 400 to manage system information, campaign information, or any other information that may not relate to the user profiles. The administrative silo 42 may also include a lookup table that may direct any data queries to the correct member silo 410. The member silos 410 may hold an equal or approximately equal fraction of the total amount of user information contained in the system 400 as determined by the load balancer 404. A system comprising two member silos may each hold approximately 50% of the total system 400 user information. Upon, registration, a user's information may be randomly stored in one member silo 410. The silo containing the user's registration data may be called the user's "home silo." Each user's information may be kept in the user's "home silo," and may remain in the home silo unless the member silos 410 may be rebalanced. By randomly assigning profiles to the silos 410, 412, the system load may be balanced and the number of user profiles saved to a single member silo 410 may be no more than any individual silo 410.

Further, the silos 410, 412 may collectively communicate with a backup system 422. The backup system 422 may store a duplicate copy of all data stored in the system silos 410, 412. The backup system 422 may include a very high memory capacity server including a primary backup server 424. An example of a very high memory capacity server 424 may be a 2 TB array server. The primary backup server 424 may communicate with a high capacity data cache 426. An example of a high capacity data cache may be a 21 slot, 2-drive LTO2 tape library such as the Exabyte® Ultrium™ family of LTO tape drives. The backup system 422 may further include a secondary backup server 430. The secondary backup server 430 may also be a 2 TB array server. The secondary backup server 430 may also communicate with a secondary high capacity data cache 432. An example of a secondary high capacity data cache may be an LTO3 tape drive such as the Quantum® LTO-3 drive.

Figure 9:
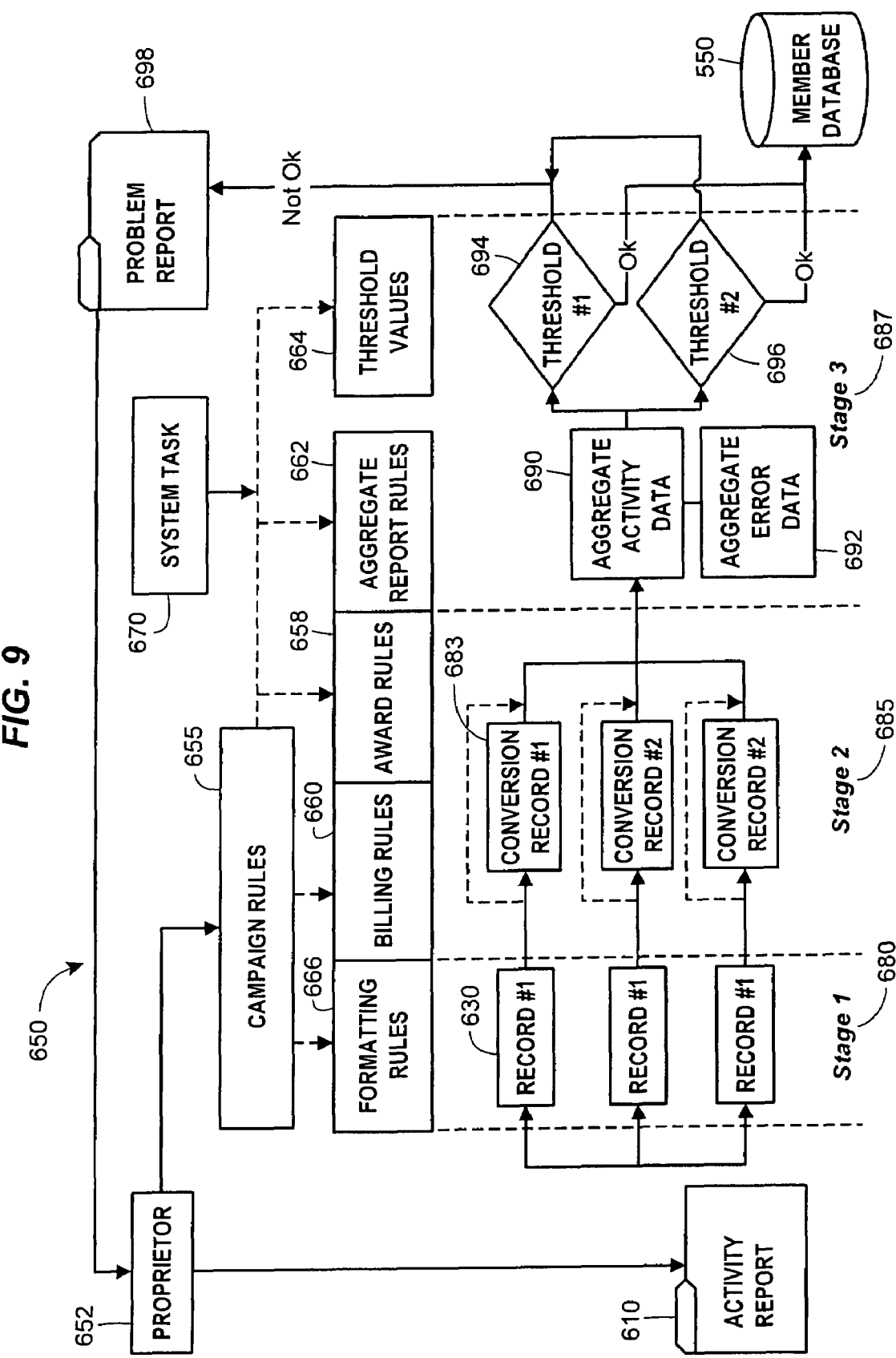
FIG. 9 illustrates the method of dry-run methodology implemented in accordance with the claims.

With reference to FIG. 9, the member silo 410 replication data servers 420 may collectively communicate with a data warehouse system 434. The replication data servers 420 may communicate with a database server 436. The database server 436 may include an extract/transform/load (ETL) server. The database server 436 may communicate with a data warehouse server 440. The data warehouse server 440 may include a 2 TB array. The data warehouse system 434 may also include legacy data related to prior versions of the points-awarding system 400. The legacy data may be stored in a modular workgroup server 442 such as the Sun Microsystems® E420R. The workgroup server 442 may further communicate with one or more data stores 444 containing the legacy data.

A proprietor interface system 446 may also communicate directly with the system 400 through the system firewall 406. The proprietor interface system 446 may allow a proprietor to directly access user data stored on the system silos 410, 412. This access may allow the proprietors to collect demographic and statistical information concerning the user data on the silos 410, 412. The proprietor interface system 446 may include a proprietor interface 450. The proprietor interface 450 may be a secure connection to allow the proprietors to upload or download data to the system 446, The proprietor interface 450 may employ a protocol enabling the secure transmission of web pages such as hypertext transfer protocol over a secure socket layer (https).

The proprietor interface 450 may be in communication with a file processing element 452. The file processing element 452 may allow proprietors to access the system 400 to shop for demographics information or to store and process client information or added demographics questions for use during user registration. Proprietors may also upload member activity which is stored as member transactions in the member's home silo and which may, further, trigger both, billable activity transactions and award transactions in association with each particular member and each particular campaign.

An e-mail relay system 448 may also communicate with the system 400 though the firewall 406. The e-mail relay system 448 may include four servers 450, 452, 454, 456 in communication with the system 400. The e-mail relay system 448 may direct incoming e-mails, such as delayed bounces from outgoing bulk mails sent by the system, to the proper components of the system 400.

A web content staging and testing system 458 may also communicate with the system in a variety of methods. For example, the web content staging and testing system 458 may communicate with the system 400 through the web severs 402. The web content staging and testing system 458 may comprise a number of general computing devices 50 that may provide a secure and efficient environment for system 400 administrators to develop a variety of data for the system 400 before the data may be deployed live.

Member Information

Figure 6:
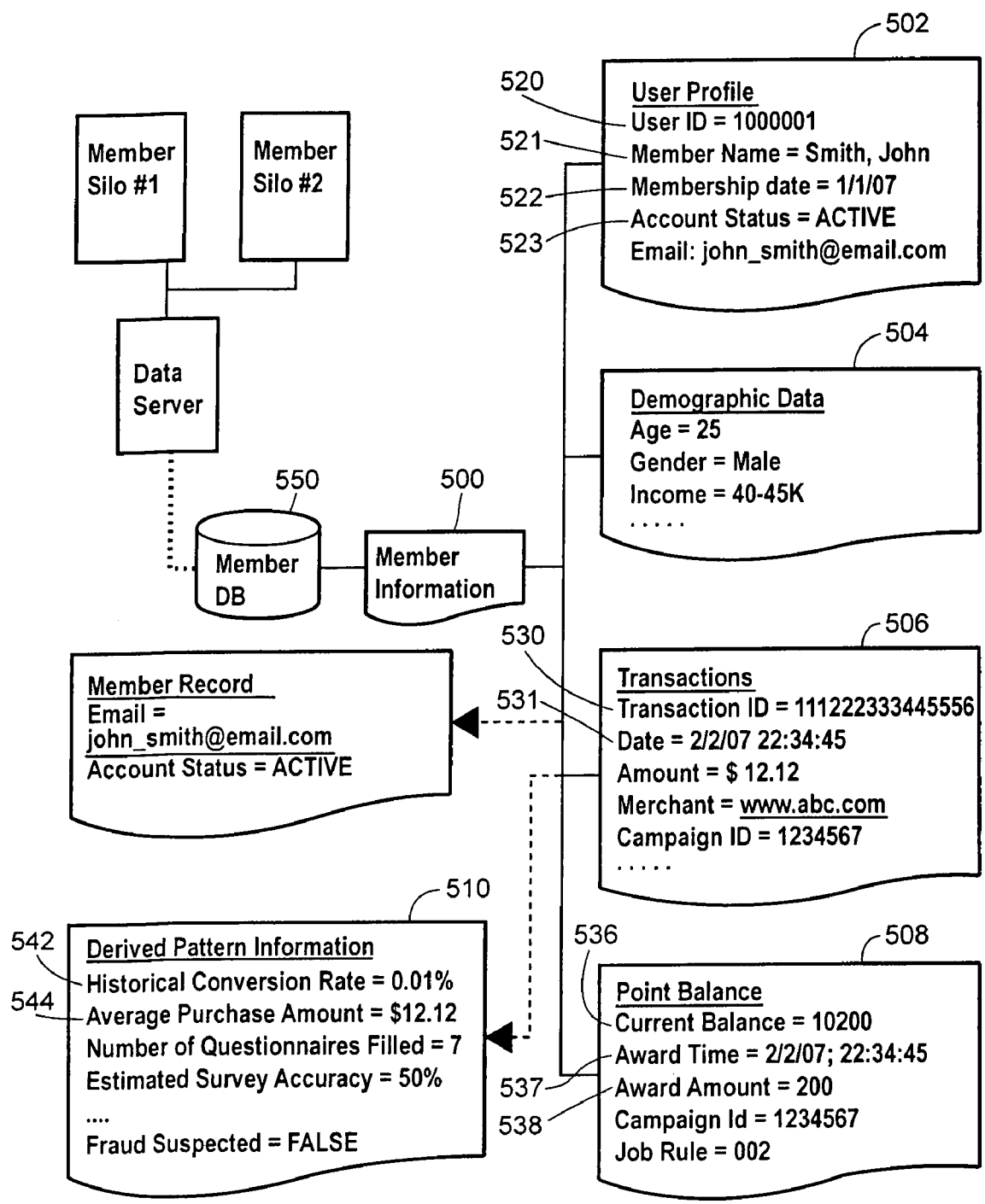
FIG. 6 is a schematic representation of an exemplary member information record stored by a demographic information gathering system.

FIG. 6 illustrates an exemplary arrangement of information related to an individual member. A member information record 500 may include sub-records 502-510. In one embodiment, records 502-510 are stored as simple or compound data fields of the member information record 500. In another embodiment, the sub-records 502-510 are stored in separate database tables or in separate databases and are logically connected to the member information 500 via shared data fields or other forms of referencing known in database design. In general, it will be appreciated that FIG. 6 illustrates a conceptual relationship between data related to an individual member and does not necessarily limit the physical storage of this data to a single data storage unit.

In reference to FIG. 6, the sub-record 502 contains data related to a profile of an individual member, or user. Each user registered with the enterprise system 40 or 400 may be assigned a unique user identification 520. As discussed above with respect to the procedure illustrated in FIG. 4, user identification may be used by the enterprise system 40 or 400 to associate various information, such as campaign data, with individual members. Further, the sub-record 502 may store the name of an individual in a data field 521 for such purposes as billing, personalizing email messages, etc. The sub-record 502 may also store a registration date 522 of the corresponding member for statistical and promotional purposes. Additionally, user profile stored in the sub-record 502 may include a flag 523 indicative of the current account status. In particular, an account of individual member may be active, frozen, suspended, or otherwise limited by an operator action or by an automated supervisory task of the enterprise system 40 or 400.

The sub-record 504 may contain demographic data related to an individual user. As discussed above, demographic data may include information related to a person's age, gender, income, job, as well as information derived from the other types of demographic data. The demographic data may be stored separately in accordance to one of many implementation choices. However, demographic data is always retrievable for an individual user. Additionally, compound demographic questions may be derived from other demographic questions by an automated process, by a request from a client, by an instruction from an administrator of the system, or by a combination of the above-listed methods.

Referring to FIG. 6, a transactions sub-record 506 may store information related to the transactions related to the particular user. For example, a user may make purchases, respond to campaign advertisements by clicking on web page or email links, and answering questionnaires. The sub-record 506 may store a history of transactions identifiable by a transaction id 530, a transaction date 531, or by another identifier or set of identifiers. For each transaction, the sub-record 506 may further store an amount spent, a name of a merchant, an identification of a campaign to which a member has responded, and other information collected by the enterprise system 40 or 400.

A sub-record 508 may hold information related to an amount of points currently allocated to the member. In addition to a data field 536 storing a current balance, the sub-record 508 may also store a history of point awards. For each historical entry, the sub-record 508 may store award time in a field 537, award time in a field 538, and a number of other fields specifying various details of a particular transaction.

The enterprise system 40 or 400 may use the data associated with a member information record 500 in order to derive additional information that may be offered to a client or used internally for such purposes as improving the accuracy of targeting members during email, campaigns, detecting abnormal account activities, etc. In addition to the derived demographic data, the system may derive browsing, clicking, spending, and other types of behavior patterns from, the purchase, award, and transaction history associated with the member information record 500. Referring to FIG. 6, the sub-record 510, corresponding to the derived pattern information for an individual member, may contain a historical conversion rate 542, an average purchase amount 544, and a plurality of other data fields. The enterprise system may update the sub-record 510 periodically or upon every registered transaction. For example, the system may track the number of click-throughs and actual conversions and update their respective ratio, stored as the conversion rate 542, for every new click-through and every conversion.

As illustrated in FIG. 9, member information may be associated with a member database 550. It will, be appreciated, however, that the member database 550 may be a conceptual arrangement of information actually stored, in separate databases but logically connected through shared fields, cross-references, or other forms of data association known in the art.

Configuring Campaign Expectations

Referring back to FIG. 5, web site proprietors may use the proprietor interface 450 to configure individual campaign rules. One of the sample screens that may be shown to a proprietor during campaign configuration is illustrated in FIG. 7. As part of campaign configuration, a proprietor may specify at least the text of an email to be sent out, a number of emails to be sent out during a particular campaign, and a rule for awarding a predefined amount of points for every time a member clicks on the offer taking him or her to a proprietor web page. As shown in FIG. 7, a screen 570 contains a text box 572. Because a proprietor may choose to create several jobs for an individual campaign, the proprietor may enter the job identification into the text box 572 and the system may, in response, update the rest of the dialogue boxes, text boxes, and radio button on the screen 570 accordingly.

A pull-down activity or task menu 574 may present a list of tasks the enterprise system 40 or 400 may execute as part of the campaign. In the example illustrated in FIG. 7, the job 001 is an email campaign, indicated by the highlighted selection in the pull-down menu 574. A proprietor may further configure the number of emails to be sent out during a particular campaign. In the exemplary screen 574, the text box 576 may accept a number from a proprietor. Additionally, the enterprise system 40 or 400 may perform, format and range checking for the text box 576 as well as for other text boxes presented in the screen 570. A proprietor may then enter the text of an email message to be delivered into a text box 577.

Further, a proprietor may specify the number of points to be awarded for a particular action, such as a visit (clicking on a hyperlink to arrive at a web page) or a purchase. For example, the screen 570 may contain a text box 578 for entering the number of points to be credited to a member for clicking on a link contained in the email advertisement and a text box 579 for configuring a number of points to be credited to a member for making a purchase. Additional options, such as delivery time, campaign duration, award conditions and limitations, etc may be configured by opening additional screens linked to the screen 570 via the buttons 580 and 581.

A proprietor may enter additional configuration data related to targeting members by clicking on the button 582. For example, a proprietor may wish to specify the principles of selecting members for a particular campaign, such as an email campaign. In accordance with one possible embodiment, a proprietor may use one or more additional screens of the interface 450 in order to select to view the available demographic questions, select one or more answers that the enterprise system 40 or 400 must match prior to sending an email to a particular member, etc. For instance, a proprietor may choose to send an email to all members who are male, whose income is between 40-50 thousand dollars per year, and who have selected at least one sport as a hobby.

Referring again to FIG. 7, a proprietor may configure campaign expectations using the proprietor interface 450. The specific interface required for selecting expectation categories and entering numerical values corresponding to each of the categories may be presented as pan of the screen 570, as another generation of the screen 570, or as a new screen linked to the screen 570 via a button or a checkbox. As used herein, expectation values refer to the estimated results of each stage of campaign activity. For example, a proprietor may know, based on his or her experience, that in a typical email campaign, approximately 99% of emails get delivered. Moreover, the proprietor may know that for the type of shopping opportunity he or she is offering, the conversion rate is at least 5%. The proprietor may then enter this data as part of campaign configuration.

As illustrated in FIG. 7, a proprietor may select the default checkbox 590 in order to populate the default expectation, values. The default values may be hard-coded or previously entered by a system administrator and stored by the enterprise system 40 or 400. These default expectation values may not correspond to any particular campaign type and may therefore represent the least precise method of using campaign expectations.

A proprietor may also use the checkbox 592 to select the option of populating campaign expectations based on the historical data associated with previous campaigns. More specifically, the enterprise system 40 or 400 may execute a procedure making a statistical inference regarding a particular type of campaign and calculate what the expected values should be for each type of a variable. Clearly, the enterprise system 40 or 400 may be able to predict certain variables, such as email delivery rate, with a high degree of reliability. In the case of email delivery rate, for example, the factors contributing to undelivered emails may be approximately the same for all demographic categories. Therefore, the enterprise system 40 or 400 may reliably apply the historical rate of email delivery to all campaign types. On the other hand, the expected conversion rate may vary significantly depending on a plurality of factors, such as the type of product, the season for which a particular campaign is scheduled, etc. In these cases, the enterprise system 40 or 400 may attempt to correlate several factors and arrive at an estimation of the expectation values in view of the particular parameters of the campaign.

Finally, a proprietor may choose not to use the options corresponding to the checkboxes 590 and 592 and configure campaign expectations manually. Alternatively, a proprietor may view the default or automatically generated values and revise these values manually upon review. As illustrated in FIG. 7, a proprietor may use the textboxes 594-598 to enter campaign expectations. In addition to entering or adjusting the expected email delivery rate in a textbox 594, a proprietor may enter the expected click rate in a textbox 595. Because the enterprise system may track each click by receiving and subsequently redirecting HTTP requests, the rate of clicking on a hyperlink embedded in an email message may serve as useful indicator of the progress of a particular campaign. Further, a textbox 596 may be used to enter the expected conversion rate and textboxes 597 and 598 may be used to enter the lower and upper limits for a projected purchase amount.

Additionally, the proprietor interface 450 may be expanded to include other variables and parameters. It will be appreciated that FIG. 7 illustrates one campaign configuration screen by way of example and not limitation.

Offline File Format

As discussed above with reference to FIG. 5, proprietors may periodically upload files to the enterprise system 40 or 400 by using the proprietor interface 450 of the proprietor interface system 446. In particular, proprietors may collect information related to member activity which may be unavailable or only partially available to the enterprise system 40 or 400. For example, a proprietor may report the details of a purchase so that the enterprise system 40 or 400 may apply the corresponding rules and possibly apply points to the member's account, calculate the new balance, and perform other processing of the information related to a particular transaction. In some cases, the enterprise system 40 or 400 may know some of the details related to a transaction. For example, the enterprise system 40 or 400 may already have recorded the timestamp of a transaction corresponding to a person clicking through on a hyperlink or an advertisement banner with an embedded hyperlink. In some cases, a record submitted as part of an uploaded file may contain a transaction identifier, in which case the enterprise system 40 or 400 may attempt to match this transaction identifier to a transaction recorded in a database. Alternatively, a record submitted by a proprietor may contain only an address and the enterprise system 40 or 400 may search for a corresponding transaction by matching the email address instead.

In other cases, proprietors gather data related to transactions invisible or mostly invisible to the enterprise system 40 or 400 in a predetermined file format. FIG. 8 illustrates an exemplary format of such a file, or an activity report, that may be populated and uploaded by a proprietor. In particular, the activity report 610 may contain a header 612 and a payload 614. Because proprietors may upload data for campaign that vary in size and duration, activity reports may not have a fixed length. One of ordinary skill in the art will recognize that files of variable length may have additional data fields, typically supplied as part of a header, that specify the number of bytes or records of a fixed size that follow, it will be further appreciated that the exemplary file format presented in FIG. 8 may additionally contain control information indicative of the size, encoding type, and other standard parameters well known in the art.

As illustrated in FIG. 8, the header 612 may contain information stored as a plurality of individual data fields 615-625 that applies to all individual records of the payload 614. Specifically, a cell ID field 615 may identify the campaign for which the data has been collected. Proprietors may use the cell ID field 615 in those cases when it is more convenient to upload data on an individual campaign basis. Alternatively, a single activity report may contain records related to member activity associated with several campaigns, in which case the field 615 may be omitted and each individual record in the payload 614 may contain a cell ID along with a unit of information identifying the member, such as an encoded member identifier or an email address.

Further, the client ID field 617 may identify the proprietor, or client, of the enterprise system 40 or 400. To minimize the chance of error, proprietors may also set the client name field 619. The submit time field 621 may be populated automatically by the proprietor interface 445 and may be used for tracking and statistical analysis. Additionally, the header 612 may contain an override flag 623. The override flag 623 may be used by proprietors to assert the quality of the supplied data and to prevent the enterprise system 40 or 400 from blocking part or all of the activity report due to suspicious or significantly irregular data. The use of the override flag 40 will be discussed in greater detail below.

The payload 614 may contain one or more individual records, or candidate data records 630. As mentioned above, each candidate record 630 may contain a campaign cell identifier 632. Further, a candidate record 630 may contain a member identification field 634. The enterprise system 40 or 400 uses the member identification field 634 to apply points and other data to a proper member or user. The candidate record 630 may also contain a member's email address 636 which may be used as a secondary form of user identification or, if member identity 634 is unavailable, as the primary form of user identification.

The field 638 may be used to store an action type id, or "action tag," corresponding to a type or class of action recorded in the record 630. For example, a purchase may be associated with the action type "1," singing up for a newsletter may be associated with the action type "2," and so on. Each action type may be associated with a particular award or bonus scheme. As discussed above, a campaign may include several jobs and each job may, in turn, include one or more job rules. Each rule may be associated with an action tag indicative of the type of action performed by a user. The enterprise system 40 or 400 may define a list of action types to be selected during configuration of a particular job. For example, a certain job may have two job rules of type "1", one job rule of type "3," and no jobs of type "2."

Further, each candidate record 630 may also contain the details related to the transaction. In accordance with one embodiment, a proprietor registers the amount spent by the member in the data field 640 if, of course, the type of action specified in the field 638 is associated with a monetary transaction. The transaction id field 642 contains the unique transaction identifier which may be used by the enterprise system 40 or 400 to cross-check the candidate record against a transaction previously registered by the transaction engine. Each of the candidate records 630 may also contain a visit id field 644, an order id field 646, and a timestamp field 648. All of the fields listed above may be used, among other purposes, for checking the accuracy of each, reported member activity, for preventing duplicate reporting of the same member activity, and for assessing the probability that a particular reported member activity is accurate. Moreover, some of the fields, such as order id field 646, may be optional or conditional. More specifically, the order id field may included by a proprietor if the proprietor wishes to perform updates, such as a new purchase amount, related to the same order.

Inaccuracies in Data Submission

As discussed above, the activity report 610 may contain a large amount of data indicative of a high number of member activities. Each member activity must be properly recorded in the corresponding database. Since each activity may be associated with a substantial awards of points or dollar amount, an inaccuracy, a typo, or a calculation error in an activity report 610 may have significant consequences. Moreover, an inaccuracy propagated throughout an activity report 610 may cause each member referred to in the activity report to be awarded a wrong amount of points. Because some of the activity reports may be generated by proprietors automatically, it is likely that an error in file formatting will appear in each individual candidate record 630.

Generating Conversion Records

Prior to saving the data contained in an activity report 610 in a member database, the enterprise system 40 or 400 may generate a plurality of conversion records from, the candidate records submitted in the activity report 610. A conversion record may contain provisional data that ultimately may be saved in the member database 550 and possibly in other data repositories maintained by the enterprise system 40 or 400. For example, the enterprise system 40 or 400 may apply a set of award rules to each reported transaction to generate the data that potentially may be added to one or more appropriate database tables. While some data fields in a candidate record 630 may not require additional processing prior to saving, other data fields may require format conversion and the application of a processing rule. Thus, a conversion record may be used as a transitional step between, receiving "raw" activity reports and checking the quality of the received data, prior to applying it to one or more non-volatile storages.

Setting Threshold Values

Referring again to FIG. 7, proprietors may enter their expectations regarding various types of activity executed as part of a campaign. The enterprise system 40 or 400 may use these values accordingly to assess the match between the expected and reported values. A large departure from the expected values may be due to an unusual campaign configuration such as a point award that is either very high or very low, as compared to the historical data. On other hand, a significant difference between expected and reported values may be indicative of a large number of errors contained in the activity report 610. In order to detect these situations, the enterprise system 40 or 400 may define a set of threshold values. Each threshold value may be set according to the level of tolerance of a certain error or irregularity. For example, a campaign manager may expect the purchase amount for a certain campaign job not to be below $20 because there may be no units of smaller value that may be sold as part of the given campaign. As discussed above, a proprietor may configure this expected purchase via proprietor interface 450 and by communicating with a screen 570 or a similar interface. Each record reporting an amount below $20 may then be considered to violate this particular expectation, which may be referred to as the "$20 or more" rule. Accordingly, a threshold value associated with the purchase amount parameter may correspond to the maximum number of candidate records within a single activity report that can violate the "$20 or more" rule without triggering a rejection of the activity report.

In case of the "$20 or more" rule discussed above by way of example, the threshold value may vary from one campaign to another and, conceivably, from one job to another within the same campaign. Clearly, applying the same threshold value indiscriminately to all campaigns may often fail to provide an accurate reflection of the accuracy of the data. Therefore, the proprietor interface 450 may have additional screens through which proprietors can adjust threshold values. Alternatively, proprietors may report threshold values in any other format, such as an offline communication with a campaign manager.

In another alternative, the enterprise system 40 or 400 maintains historical data which it uses to derive threshold values. For example, the enterprise system 40 or 400 may execute a software routine to infer, from several previous activity reports and from the error rates associated with these activity reports, an average amount of records in an activity report that have an invalid email address. In one embodiment, the enterprise system 40 or 400 may generate additional statistical indicators such as standard deviation in order to generate a reasonable threshold value. The enterprise system 40 or 400 may then compare the number average and may decide, based on a corresponding threshold value, whether the submitted activity report passes or fails the quality test associated with the threshold value. As a result, the enterprise system may prevent the submitted activity report from being applied to the member database 550.

In another aspect, an individual record of an activity report may not violate any particular rules or principles but the aggregate amount of records in the activity report may not match one or more statistical expectations. For example, there may be too many records in an activity report reporting a conversion. In some cases, such statistical anomaly may indicate that a particular campaign is unusually successful possibly due to a generous offer, a seasonal demand for a product or service, or a similar reason. However, in other cases, this statistical anomaly may be due to errors or fraudulent activity. Therefore, there may be threshold values associated with the maximum deviation from the statistical norm that may be considered not suspicious. These threshold values may also be generated automatically or configured by authorized users such as campaign managers or proprietors.

Processing Candidate Data

FIG. 9 illustrates a dry-run method 650 of processing a candidate data record implemented in accordance with several embodiments discussed herein. A web site proprietor, or client 652 may generate several levels of business, billing, and formatting rules associated with one or more jobs of a particular campaign. More specifically, a client 652 may specify a set of campaign rules 655 that may include award rules 658 and billing rules 660. Additionally, the campaign rules 655 may include campaign expectations, or aggregate report rules 662. As discussed above, an example of an aggregate report rule may be such a statement as "the expected conversion rate on this offer is 1% of all email recipients." As discussed above, this rule may be entered by using a pre-defined set of text and dialogue boxes of the proprietor interface 450. The campaign rules 655 may further include threshold values 664 associated with the aggregate report rules 662, formatting rules 666, or both.

In one embodiment, threshold values may not be supplied as an explicit part of the campaign rules 655. In particular, the threshold values 664 may be derived from the campaign rules 655 automatically. In another embodiment, a set of threshold values is explicitly entered via the proprietor interface 450 and stored as part of the campaign rules 655. In yet another embodiment, the threshold values are configured by a campaign manager and stored in the enterprise system 40 or 400. Referring to FIG. 9, a system task 670 is responsible for retrieving system-wide parameters related to thresholds and pre-defined rules.

Formatting rules may be supplied by the system, task 670. In particular, there may be a plurality of formatting rules applicable to all data received as part of an activity report 610, irrespective of the specific client and campaign information. Additionally, proprietors may supply their own formatting rules to replace or complement the pre-defined formatting rules 666. Moreover, the formatting rules 666 may include a combination of the formatting rules supplied by a proprietor and system-wide rules supplied by the system task 670.

Once the activity report 675 is uploaded by a proprietor 652, the dry-run method 650 initiates the first processing stage 680. During the stage 680, the method 650 parses the header to 612 to obtain such information as a campaign cell id, a client id, an optional override flag, a number of candidate records 630 in the activity report 610, etc. Next, each individual candidate record 630 of the activity report 610 may be processed individually and checked for formatting or cross-reference errors. As part of the analysis performed at the processing stage 580, a candidate record 630 may go through such forms of checking as confirming that the timestamp is valid, such as confirming that the date stored in the timestamp field 648 is not in the future or is not too far in the past, verifying that a campaign cell id is in the valid, range, confirming that each mandatory data field, such as the member identifier 634, is properly filled in, etc. In the same stage 680, those data fields in the record 630 that are registered in the enterprise system 40 or 400 in real time may also be cross-checked. For example, if click-through events are registered by the enterprise system (by recording redirect requests or similar actions) and also submitted in a similar or more detailed form in an activity report 610, the dry-run method 650 may look up the corresponding transaction in the transaction or member database and verify the accuracy of the record.

As another example, a user may at some point be redirected to a proprietor site and the redirect may be recorded by the enterprise system 40 or 400 as a transaction with a corresponding timestamp. The system may then receive a record contained in an uploaded file which refers to a purchase made by the user on the same proprietor site. The system may then check whether the purchase data is reported at a later time than the corresponding click-through and may further check whether the purchase occurs within a reasonable time period after the click-through, such as 72 hours, for example. The differences in time between the two timestamps that do not appear reasonable may be flagged as suspicious. Importantly, the suspicious data need not be rejected completely and may be only marked as requiring the attention of a campaign manager, a proprietor, or a properly authorized user.

In accordance with one embodiment, the method 650 records each violation of a processing rule. For example, each record may be temporarily assigned a set of flags, each flag corresponding to an actual or suspected formatting violation, such as an invalid timestamp or a transaction id that could not be cross-referenced. In one embodiment, each flag may be a binary flag indicative only of a presence or absence of a violation in the corresponding record. In other words, it may not be necessary or convenient to record the magnitude of a violation, and thus two dates which are ahead of the current date by 1 day and 1 year, respectively, may be flagged in the same way. These flags may be organized in an array, a linked list, or a file stored in a non-volatile memory. In accordance with another embodiment, each candidate record is associated with only one formatting flag in order to conserve space and processing power. In this embodiment, each record is flagged if it contains one or more formatting violations and not flagged if it contains exactly zero formatting violations. As discussed below in greater detail, the flags may be included in the aggregate error data 692.

Next, the billing rules 660 and the award rules 658 may be applied to the set of candidate records 630 to produce the conversion records 683. In particular, each conversion record corresponds to one candidate record, and vice versa. In another embodiment, generating a set of conversion records 683 from a set of candidate records 630 is omitted because depending on the particular implementation of the enterprise system 40 or 400, it may be more convenient to process candidate records 630 directly at the stages 685 and 687. Referring again to the embodiment illustrated in FIG. 9, each conversion record may be generated according to some or all campaign rules and may contain such information as the number of points to be awarded to the corresponding member for the activity reported in the candidate record 630, the amount of dollar revenue that may be billed to the proprietor as sale commission, and similar data. The generation of conversion records may be conceptually organized into a second stage (685) of the method 650.

Moving on to the third stage (687) of the method 650, the conversion records 683 may be checked against a set of aggregate report rules and the corresponding thresholds. As illustrated in FIG. 9, the aggregate rules and threshold values may come from the proprietor 652, the system task 670, or both. At the third stage of the processing, the conversion records 683 or, depending on the chosen embodiment, candidate records 630, may be considered together as an aggregate activity data 690 along with an aggregate error data 692. However, it will be appreciated that the aggregate activity data 690 may not correspond to an actual arrangement of records in physical memory and is shown in FIG. 9 as a single block by way of illustration only. Similarly, the aggregate error data 692 may be linked to the aggregate activity data 690 only conceptually and may be disposed in a separate physical location.

When processed as an aggregate activity data 690, the data in the activity report 610 is checked for campaign consistency. As part of campaign consistency checking, the method 650 may refer to the aggregate error data 692 which contains at least the results of format checking carried out in the first stage (680). In one embodiment, the aggregate error data 692 includes a collection of flags for every flagged field of every individual candidate record 630. In another embodiment, the aggregate error data 692 contains only the totals for each data field. For example, the aggregate error data 692 may include an indication that 11 out of 1000 candidate records 630 in an activity report contain invalid data and 10 out of 1000 candidate records have an invalid member id.

Importantly, the aggregate error data 692 may not be sufficient in analyzing the quality of the activity report 610. For example, the conversion rate reflected in the activity report 610 may be unusually high while each individual record may be properly formatted and may appear probable when considered by itself. In the case of conversion rates, each member who has clicked through on a page directed to a purchase offer may have in fact accepted the offer. However, the system task 670, the proprietor 652, or an authorized user such as a campaign manager may consider the probability of a very high conversion, such as 50%, extremely improbable. Thus, the threshold checks 694 and 696 may be applied to both the aggregate activity data 690, aggregate error data 692, or to both.

Further, various parameters may be checked in combination. For example, the aggregate activity data 690 may indicate that too many members have made a purchase within a certain time period. In one embodiment, the proprietor interface 450 may allow proprietors to specify the combinations of data that are unexpected and to further allow proprietors to specify a corresponding threshold for the maximum number of candidate records 630 that are allowed to have this combination.

Referring again to FIG. 9, the aggregate activity data 690 and the aggregate error count 692 may be compared to several thresholds either in parallel or sequentially. The results of threshold checking may be reflected in a problem report 698. If no thresholds are exceeded, the problem report 698 may not be sent to the proprietor 612 or may contain only a positive acknowledgement. If set, the override flag 623 in the header 612 may also prevent the problem report 698 from being generated or sent to the proprietor.

In another embodiment, those candidate records 630 that are not flagged by the method 650 are applied to the database while the flagged, or suspicious records are referenced in the problem report 698 and are prevented from being saved to the member database 550 until the proprietor 652 either confirms the accuracy of the data or takes a corrective action with respect to the flagged records. In this case, the proprietor 652 may submit a new activity report 610 containing only the corrected data.

Finally, the aggregate activity data 690 may be applied to the member database 550. As discussed above, applying transaction data to the database may include recording point awards, updating point and account balances, updating statistical counters, etc. Clearly, the step of applying data to the member database 550 may be difficult to undo. Moreover, the data in the member database 550 may be later used for statistical modeling, predictions, and comparisons. Thus, the method 650 may prevent the contamination of data by identifying and flagging potentially erroneous data.

Internal Generation of Activity Reports

Figure 10:
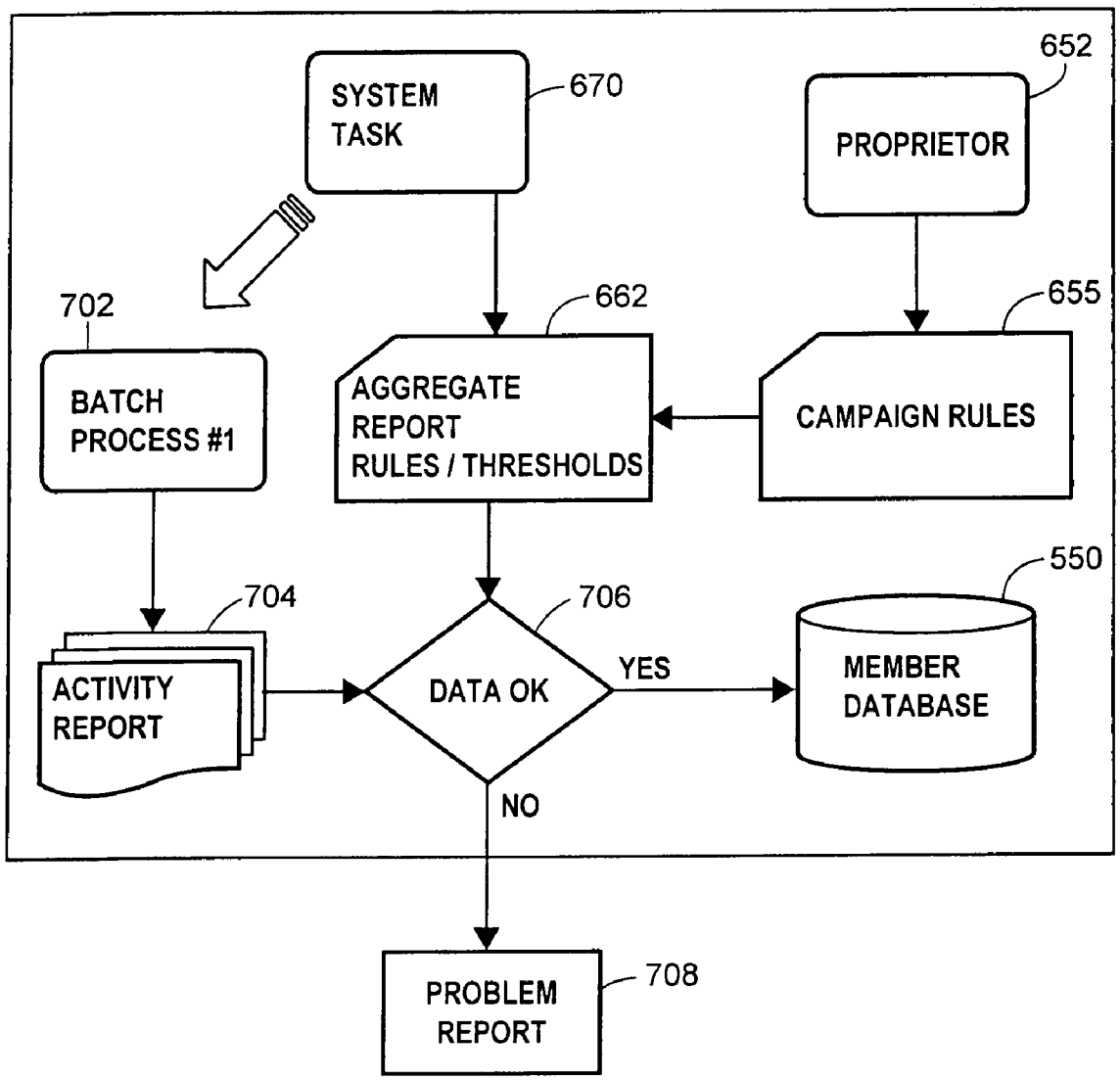
FIG. 10 illustrates the generation of a report of FIG. 7 by an batch process running in the information gathering system of FIGS. 1-4A.

FIG. 10 illustrates an exemplary process of generating activity reports by a batch process associated with the enterprise system 40 or 400. As in the processes illustrated in FIG. 9, the proprietor 652 may configure a set of campaign rules 655 associated with at least the aggregate report rules 662. Further, the campaign rules 655 may necessitate the execution of a batch process 702 by the system task 670. For example, a campaign rule may state that by completing five activities within a predetermined period of time, a member may be eligible to receive a bonus award of 50 points. At least because each of these transactions may be reflected in a separate activity report 610, checking for the member who may have completed the five-offer challenge and generating the corresponding transaction may be carried out automatically by an internal batch process. It will be appreciated that the batch process 702 may be triggered and executed in a plurality of ways, such as running a background task in the administrative silo 156. Further, the batch process 702 may be partially or completely autonomous from the system task 670.

In operation, the batch process 702 may generate an activity report 702 similar to the activity report 610 submitted by the proprietor 652. Clearly, the probability of encountering formatting mistakes in an automatically generated, report 702 is very low. However, campaign consistency mistakes originate either in the logic of the campaign rules or in the previous activity reports. Thus, it may be desirable to apply at least part of the dry-run method 570 to the internally generated activity report 704.

As illustrated in FIG. 10, some of the checking, such as formatting rule checking, may be skipped and the activity report 704 may be processed by applying the aggregate report rules and thresholds directly. The data may be compared against one or more threshold value in block 706 and either applied to the member database 550 or flagged for review. A problem report 708 may be similar to the problem report 698 but may additionally contain system-specific references for the authorized users.

Levels of Candidate Record Processing

Figure 11:
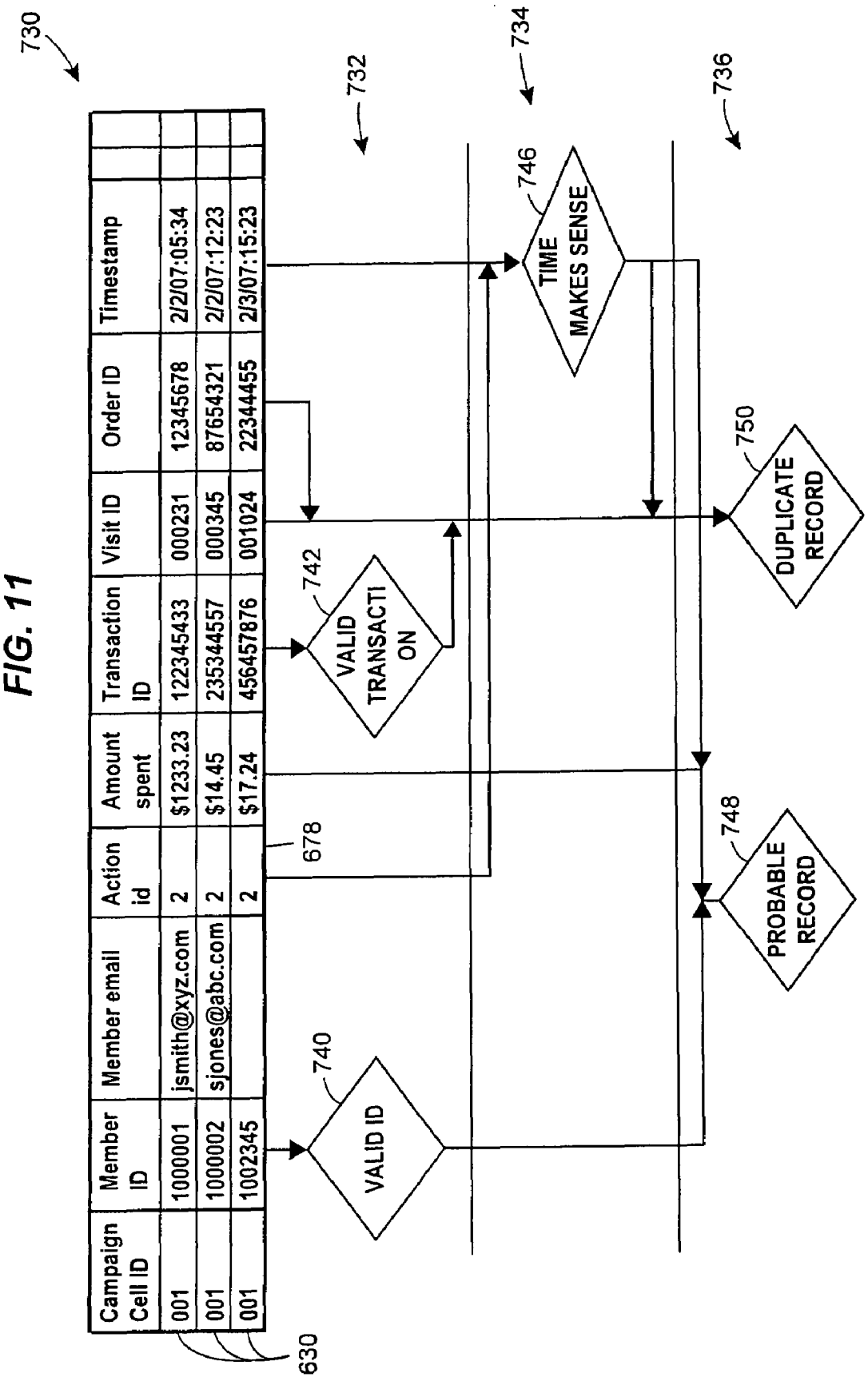
FIG. 11 is a schematic representation of the processing of candidate record included in the file of FIG. 7.

FIG. 11 further illustrates the processing (730) of an individual candidate record 630. In general, the process 730 may be understood as consisting of several layers of verification, or steps 732-736. At the initial step 732, basic data field validity is checked, such as checking the member identification validity in block 740 and 742. At this stage of processing, only individual data fields may be considered. Next, certain data fields may be considered in view of the result of checking other data fields at the step 734. As illustrated in FIG. 11, at block 746 the timestamp may be checked for "making sense" in view of the action tag 638 because the action tag may specify the type of activity that is unlikely or prohibited at the time specified in the timestamp field. The timestamp may be first checked against the current date at the step 732 (not shown) and then checked again for consistency in view of other fields of the data record 630. Referring back to FIG. 9, the checking at the step 736 may again involve one or more data fields as well as the results from the step 724. Specifically, the probability that the given candidate record 630 is accurate may be computed in block 748 and the duplication of the record may be checked in block 750.

Checking for Duplicate Submissions

The duplication of a candidate record may be caused by an interrupted upload process or simply by a human error. In either case, applying the same data to the member database 550 may result in a wrong number of awarded points, wrong statistical interferences, and similar problems. Further, applying the same data two or more times may cause concern among members and may thus trigger inquiries and complaints. Thus, ensuring that data is applied to the member database 550 only once is clearly desirable in a demographic data gathering system.

As illustrated in FIG. 11, duplication checking may involve combining such data fields as transaction ID 642, visit ID 644, order ID 646, and timestamp 648 into number. One or ordinary skill in the art will appreciate that fewer or more data fields can also be used to generate a unique submission indicator. It will be further appreciated that the unique submission indicator may be produced, for example, by one of many hashing techniques known in the art.

The unique submission indicator may be generated for every candidate record 630 and may be registered in the member database 630 for each record successfully applied to the database. In case of duplicate submission, the enterprise system 40 or 400 may generate the same submission indicator, compare the submission indicator to a list of previously saved submission indicators, and prevent the duplicate record from being applied to the member database 550.

Figure 11A:
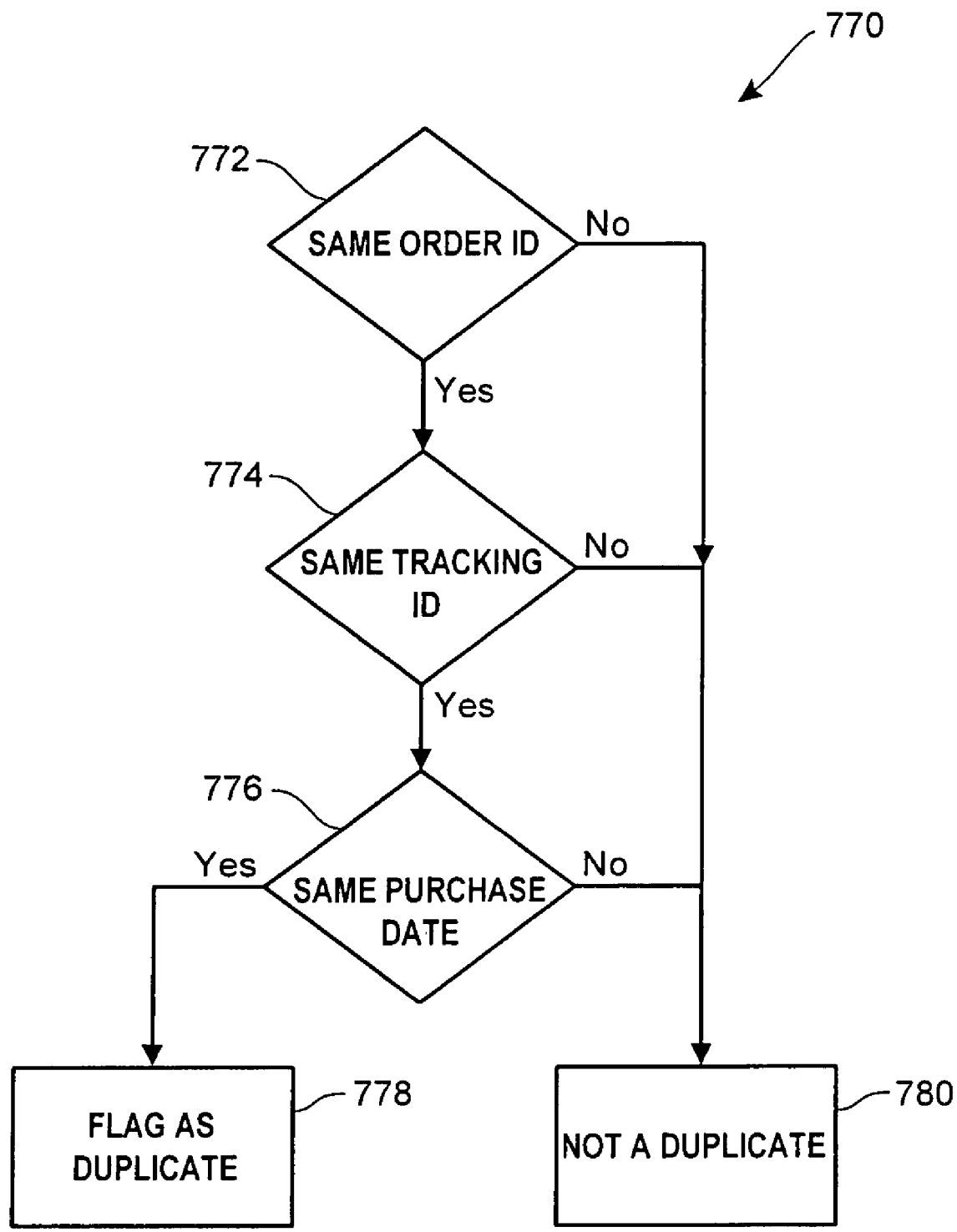
FIG. 11A is a flowchart describing a method of one example of detecting duplicate record submission.

An exemplary procedure 770 of checking for record duplication is further illustrated in FIG. 11A. The procedure may check whether the order id is the same at the block 772, check the tracking id in the block 774, and finally check the purchase date at the block 776. The procedure 770 may mark the record as duplicate at the block 778. On the other hand, a single mismatch in the three parameters listed above means that the record is not a duplicate and the procedure may set the corresponding flag at the block 780.

Detecting Fraudulent Behavior

The method generally described herein and illustrated in FIGS. 6-11 may also be used to detect fraudulent behavior. For example, a member may actively pursue filling out questionnaires for the purpose of obtaining points and may submit false data to the enterprise system 40 or 400. In these cases, the demographic data submitted as part of a filled questionnaire may contain made-up zip codes, made-up email accounts, and other false data. By checking the integrity of the data submitted prior to applying the data to the member database 550 and thus prior to issuing points and other awards, the system may flag the data that contains too many mismatches. In one embodiment, a proprietor may instruct a campaign manager to consider no more than X mismatches acceptable. For example, a proprietor may fix X at a value of 2 and the enterprise system 40 or 400 will flag all submissions corresponding to members failing 2 or more cross-checks in their reported data. The enterprise system 40 or 400 may not necessarily discard the flagged data but only delay applying the suspected records to the database until the proprietor issues an explicit approval.

Sample Programming Logic

Figure 12:
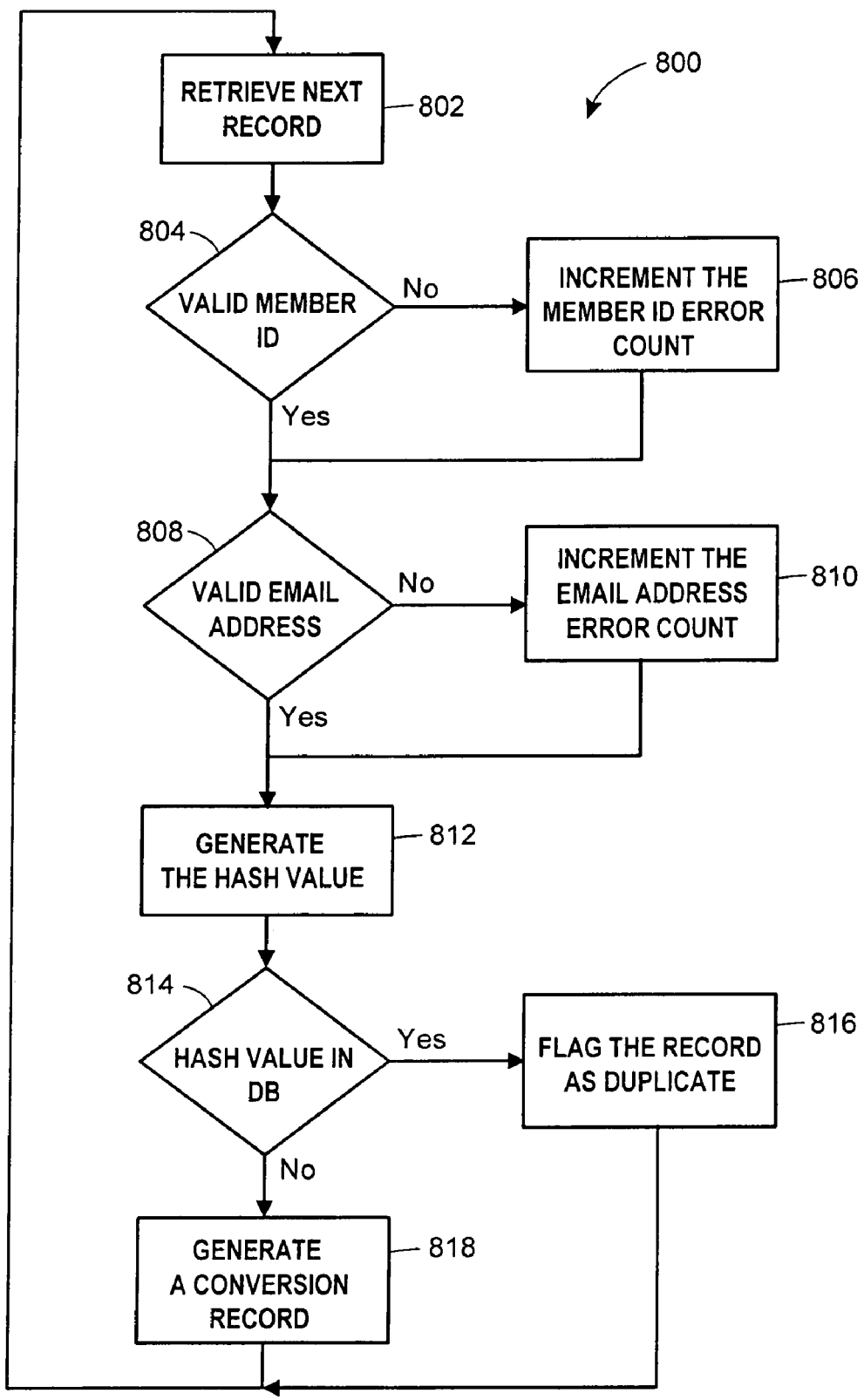
FIG. 12 is a flowchart describing a method of one example of verifying an individual record included in the file of FIG. 7.

FIG. 12 illustrates an exemplary procedure 800 that may be implemented on a host of the enterprise system 40 or 400, such as the file processor 425, The procedure 800 starts at the block 802 by retrieving a next candidate record 630 from an activity report 610 or 704. The procedure 800 may check whether the member identity is valid at the block 804. Specifically, the procedure 800 may execute a database query across the member silos 154 and check the results of the query. If the procedure 800 determines that the member identification is invalid or improperly formatted, the procedure 800 may increment a corresponding flag in the block 806. The procedure 800 may then process the email address field in a similar manner, as illustrated in the blocks 808 and 810. It will be appreciated that any number of available data fields may be checked according to the principles illustrated in FIG. 12.

Next, the procedure 800 generates a unique hash value in the block 812. The generated hash value may be used as an operand in a database query executed at the block 814. If the result of the database query indicates that the hash value is already present in the database, the procedure 800 may flag the record as duplicate in the block 816. Otherwise, the procedure 800 may proceed to generating a conversion record in the block 818, thus preparing the record for application to the member database 550 provided the record and/or the associated activity report passes the next level of checking.

Figure 13:
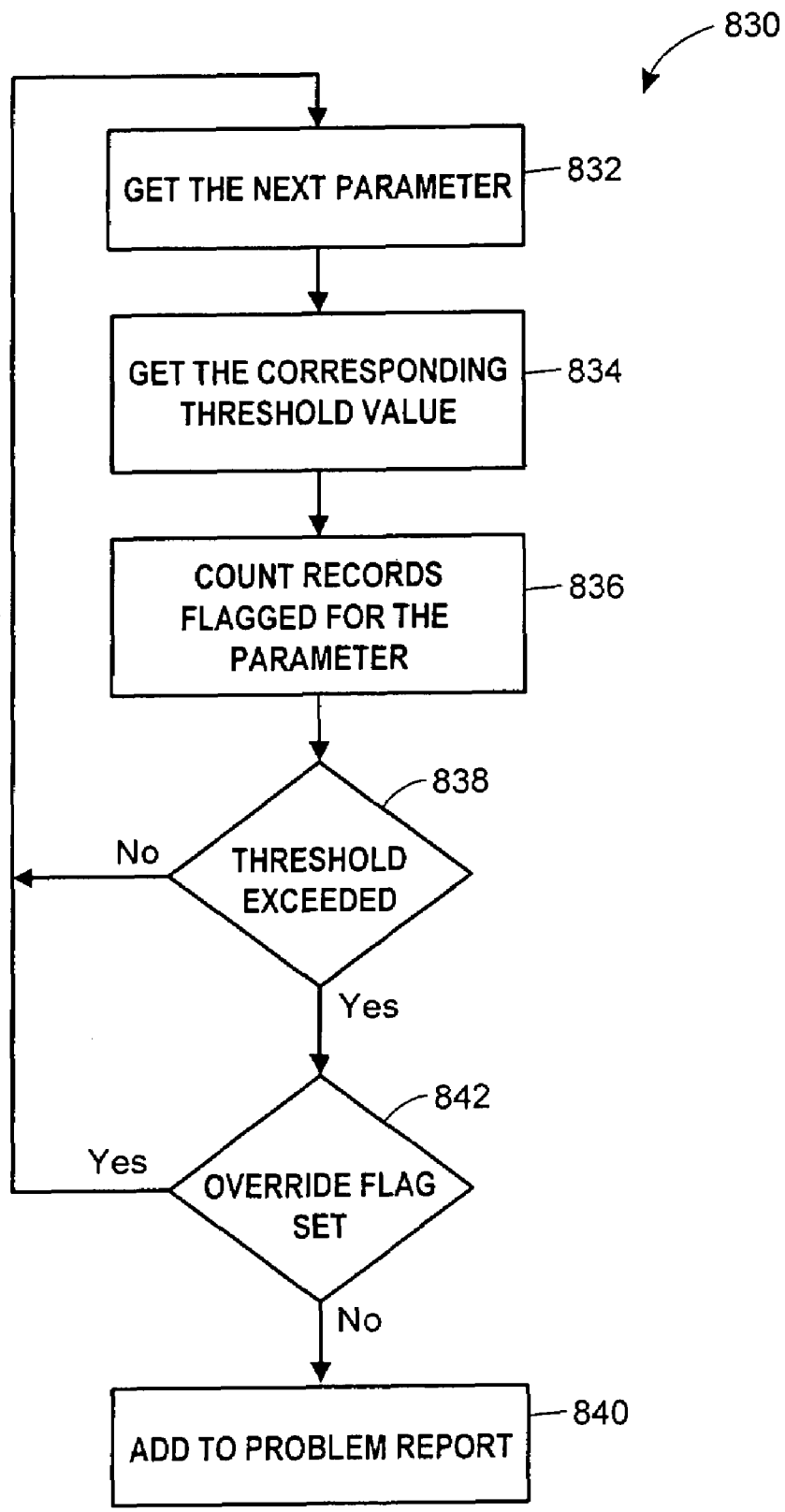
FIG. 13 is a flowchart describing a method of one example of verifying threshold violation in a file of FIG. 7.

This next level of checking may be implemented as a procedure 830 illustrated in FIG. 13. At the block 832, the procedure 830 retrieves the next parameter that may be checked against a certain threshold value. This parameter may be a flag corresponding to a certain formatting error, such as invalid timestamp, or a value of a certain data field, such as purchase amount, or an answer to a compound statement such as "how many candidate records report click-throughs between 10 and 13 a.m.?" Next, the procedure 830 may retrieve the threshold value associated with the parameter retrieved in the block 832. For example, a proprietor may have indicated that no more than 2% of the submitted records should have an invalid member identifier. At the block 832, the procedure 830 may receive the 2% from such source as the campaign database.

Next, the procedure 830 may count the number of records in the corresponding activity report that violate the principle associated with the parameter retrieved in the block 832. In another embodiment, the procedure 830 may not have to count the records at this step because the computation may have been already completed at an earlier stage of the method 650. The comparison between the counted records and the threshold value may take place in the block 838 and, if the threshold value has not been exceeded, the procedure may return to the block 832 to retrieve and process a new parameter. If, however, the threshold has been exceeded, the procedure may register this condition in a problem, report at the block 840 unless the override flag is set and confirmed in the block 842.

Figure 14:
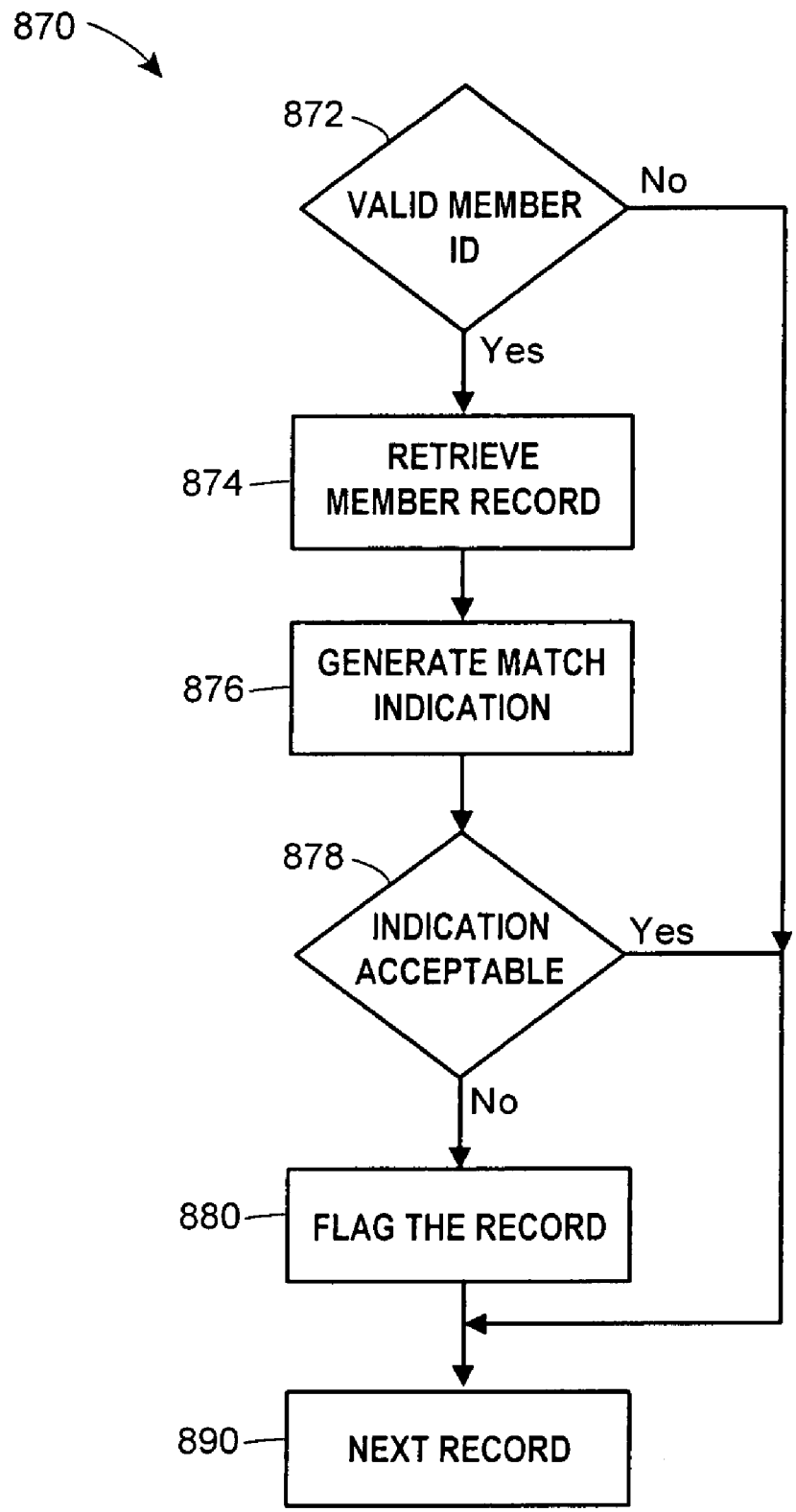
FIG. 14 is a flowchart describing a method of one example of assessing the quality of a record included in the file of FIG. 7.

FIG. 14 illustrates an exemplary logic of a procedure 870 that performs an optional procedure of assessing the match between a give candidate record and the historical data associated with the member identified in this candidate record. At the block 872, the procedure may perform the step of verifying whether it is possible to retrieve the historical data for the member. Next, the procedure 870 executes a database query at the block 874. The query need not retrieve the complete member information as the overhead may be too high. Instead, the query may only target those fields that may be indicative of certain patterns in the behavior of the member, such as the sub-record 510 schematically shown in FIG. 6. In one embodiment, the data retrieved in the block 874 contains the average conversion rate for the corresponding member, the average click rate, the average amount spent per purchasing transaction, etc. This data may also include standard deviation for each average so that the procedure 870 could generate a match indication in the block 876 by using standard statistical methodology.

At the block 878, the procedure 870 may check whether the data submitted in the candidate record is acceptable in view of the historical indicators received in the block 874. Next, the record may be flagged as suspicious at the block 880 if the candidate record represents a significant deviation from the historical data. Finally, the procedure may obtain the next record in the block 890 and return to the block 872 until all records are processed.

Resuming Interrupted Data Uploads

It will be appreciated that the method described above further allows for efficient resuming of data uploads. For example, if an activity report such as 610 or 704 is partially uploaded to the member database 550 and a system component such as the file processor 452 crashes, the hash values assigned to each candidate record and registered in the member database 550 in accordance with one of the embodiments described above makes a restart of the upload procedure safe by eliminating the risk of applying duplicate data to the database. The enterprise system 40 or 400 may accept the partially processed activity report in its entirety, generate the hash values for each record, and apply all records to the database. Because the database may store the hash values for each applied record, the database may simply omit the records submitted with the same hash value to avoid duplication.

Correcting Errors in Campaign Rules in Post-Time

Moreover, the method described herein may further provide an efficient approach to correcting human operator mistakes made during campaign configuration. In particular, separate hash values may be computed every time a campaign rule is applied to the candidate data, such as every time a conversion is recorded in the database or award points are added to a member's account. If, for example, a campaign was configured to award a wrong number of points for a particular transaction, a campaign manager may simply add a new rule to the corresponding campaign and process the same activity report again. The use of hash values described above will prevent the new conversion records from being applied to the database. However, in accordance with one possible embodiment, each record may be processed anyway to generate the number of points to be awarded, for example. The generated value may be compared to the previous value to check whether the previously applied amount matches the generated amount of points. In case of a mismatch, the enterprise system 40 or 400 may be adapted to calculate the difference, which may be positive or negative depending on the error in campaign configuration, and to apply the difference to the database as an additional transaction.

It will be further appreciated that the same method may be used to handle the case when a crash occurs while data is being processed and applied to the database. If, for example, a conversion record has been successfully generated, stored, but the enterprise system 40 or 400 has not yet calculated or applied the points for the transaction record, the situation may be corrected by simply submitting the same records again for processing. In accordance with the method discussed above, the system may perform a new calculation for every record, compare the points already applied, and generate a corrective transaction when necessary.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed:

1. A method of processing data in an information gathering system, comprising:
   receiving a set of candidate data records;
   attempting to obtain a set of processing rules associated with the set of candidate data records;
   if the set of processing rules is successfully obtained:
      obtaining a set of quality criteria associated with the obtained set of processing rules, including obtaining at least one threshold value;
      applying the set of processing rules and the set of quality criteria to the set of candidate data records to produce a set of quality indicators, including applying a threshold test rule included in the set of processing rules and associated with the at least one threshold value and an expected quantity indicator, wherein applying the threshold test rule includes:
      generating an actual quantity indicator; and
      processing the actual quantity indicator, the expected quantity indicator, and the at least one threshold value in accordance with a formula to generate a respective one in the set of quality indicators;
      conditionally applying the set of candidate data records to a database associated with the information gathering system based on the set of quality indicators; and
   if the set of processing rules is not successfully obtained:
      preventing the set of candidate data records from being saved in the database.

2. The method of claim 1, wherein conditionally applying the set of candidate data records comprises:
   storing a first subset of candidate data records in the database, wherein each record in the first subset is associated with a first quality indicator; and
   preventing a second subset of candidate data records from being stored in the database, wherein each record in the second subset is associated with a second quality indicator.

3. The method of claim 2, further comprising providing a result information to a merchant associated with the information gathering system, wherein the result information comprises:
   a list of rejected candidate data records; and
   the rule and the quality criteria applied to each of the rejected data records.

4. The method of claim 1, wherein receiving a set of candidate data records includes receiving a merchant identification uniquely identifying one of a plurality of merchants associated with the information gathering system.

5. The method of claim 4, wherein attempting to obtain a set of processing rules includes verifying whether a merchant specific group of processing rules has been received from a merchant identified by the merchant identification prior to receiving the set of candidate data records, and wherein the merchant specific group of processing rules is only applied to data received from the merchant.

6. The method of claim 5, wherein receiving a set of candidate data records further includes receiving a campaign identification uniquely identifying at least one campaign associated with a proprietor identified by the proprietor identification; and wherein
   attempting to obtain a set of processing rules further includes verifying whether a campaign specific group of rules identified by the proprietor identifier has been received prior to receiving the set of candidate data records, and wherein the campaign specific group of rules is only applied to data associated with a campaign identified by the campaign identifier.

7. The method of claim 6, wherein the campaign specific group of rules is received from a merchant identified by the merchant identification.

8. The method of claim 6, wherein the campaign specific group of rules is received from the information gathering system or from an authorized user associated with the information gathering system.

9. The method of claim 5, wherein attempting to obtain a set of processing rules further includes receiving a general group of processing rules from the information gathering system, and wherein the general group of processing rules is applied to data received from all merchants associated with the information gathering system.

10. The method of claim 1, wherein receiving a set of candidate data records includes receiving a set of data fields as part of each candidate data record.

11. The method of claim 10, wherein conditionally applying the set of candidate data records to a database associated with the information gathering system includes:
   defining a first and a second subset of the set of data fields, wherein the first subset is associated with a first quality indicator and the second subset is associated with a second quality indicator;
   for each candidate data record, applying the first subset to the database; and
   for each candidate data record, preventing the second subset from being applied to the database.

12. The method of claim 1, wherein attempting to obtain a set of processing rules associated with the set of candidate data records comprises:
   obtaining a first subset of record specific processing rules, wherein each processing rule in the first subset defines a manner of individually processing a single record; and
   obtaining a second subset of aggregate processing rules, wherein each processing rule in the second subset defines a manner of processing a collection of data records.

13. The method of claim 1,
   wherein the expected quantity indicator is indicative of a test value expected to be produced when the first aggregate processing rule is applied to the candidate set of data.

14. The method of claim 1, wherein obtaining the expected quantity indicator includes checking a history of applying the first aggregate rule to a plurality of sets of candidate data and calculating an historical average.

15. The method of claim 1, wherein the formula includes:
   computing the difference between the actual quantity indicator and the expected quantity indicator; and
   comparing the computed difference to the threshold value to produce the quality indicator.

16. The method of claim 1, wherein the formula includes:
   calculating a percentage indicator from the ratio of the actual quantity indicator with respect to a size of the set of candidate data records; and
   comparing the percentage indicator to the expected quantity indicator to produce the quality indicator.

17. The method of claim 1, wherein the formula includes:
calculating a first percentage indicator from the ratio of actual quantity indicator with respect to a size of the set of candidate data records;
calculating a second percentage indicator from the expected quantity indicator with respect to a size of the set of candidate data records;
comparing the difference between the first percentage and the second percentage to the threshold value to produce the quality indicator.

18. The method of claim 17, wherein conditionally applying the set of candidate data records further includes:
preventing all candidate data records from being stored in the database if the quality indicator corresponds to a first value.

19. The method of claim 1, wherein applying the threshold test rule to the set of candidate data records to produce the actual quantity indicator comprises:
generating a set of individual quantity indicators from the set of candidate data records, wherein each individual quantity indicator is derived from a candidate data record; and
deriving the actual quantity indicator from the set of generated individual quantity indicators.

20. The method of claim 19, wherein obtaining an expected quantity indicator associated with the threshold test rule comprises:
storing rule application results produced by applying the threshold test rule to a plurality of sets of related data records, wherein the set of candidate data records and each of the sets of related data records are associated with the same campaign; and
deriving the expected quantity indicator from the rule application results.

21. The method of claim 12, wherein obtaining a first subset of processing rules includes obtaining a first record specific rule, wherein the first record specific rule defines a manner of checking whether an individual data field in a candidate data record is properly formatted.

22. The method of claim 12, wherein obtaining a first subset of record specific processing rules includes obtaining a first record specific rule, wherein the first record specific rule defines:
obtaining a value of a reference data field from a record in the set of candidate data records; and
searching for the value of the reference data field in the database to generate a presence indicator.

23. The method of claim 12, wherein the set of candidate data records is received from a merchant associated with the information gathering system; and wherein
obtaining a first subset of record specific processing rules includes obtaining a first record specific rule, wherein the first record specific rule is adapted to:
identify a member associated with a candidate data record, wherein the member is registered with the information gathering system and wherein the candidate data record contains information indicative of a business transaction between the member and the merchant;
define a procedure processing at least one data field in the candidate data record to produce at least one quality indicator in the set of quality indicators.

24. The method of claim 23, wherein the procedure further comprises:
retrieving a historical data associated with the member;
comparing the historical data with the candidate record to produce a pattern indicator; and
conditionally associating a quality indicator in the set of quality indicators with the pattern indicator depending on the value of the pattern indicator.

25. The method of claim 1, wherein receiving a set of candidate data records comprises:
defining an internal batch process associated with the information gathering system, wherein the internal batch process executes a set of operations upon data stored in the database associated with the information gathering system;
defining a triggering condition associated with the internal batch process;
automatically executing the internal batch process when the triggering condition is met; and
receiving the first candidate data record from the internal batch process.

26. The method of claim 1, further including:
optionally receiving an override indicator; and
unconditionally applying the set of candidate data records to the database if the override indicator is received.

27. The method of claim 1, further including:
creating a transaction identifier for each candidate data record stored in the database;
associating the transaction identifier with the candidate data record; and
storing the transaction identifier within the information gathering system.

28. The method of claim 23, wherein creating a transaction identifier includes generating a hash value from one or more data fields present in the candidate data record.

29. The method of claim 28, further including:
searching for the transaction identifier in the information gathering system prior to storing the candidate record in the database to produce a duplication indicator; and
preventing the candidate data record associated with the transaction identifier from being stored in the database if the duplication indicator corresponds to a value indicative of the candidate record being already present in the database.

30. A method of processing candidate data in an information gathering system, comprising:
receiving a set of candidate data records;
obtaining a first set of processing rules, wherein each processing rule in the first set defines an operation applicable to an individual record from the set of candidate data records but not applicable to the set of candidate data records as a whole;
conditionally obtaining a second set of rules, wherein each rule in the second set defines an operation applicable to the set of candidate data records but not applicable to an individual data record from the set of candidate data records;
obtaining a first expectation value associated with one of the rules in the second set of rules;
applying the first set of rules to each record in the set of candidate data records to produce a set of record quality indicators;
applying the second set of rules to the set of candidate data records to produce a set of aggregate quality indicators;
conditionally applying the set of candidate data records to a database associated with the information gathering system based on the set of record quality indicators and on the set of aggregate quality indicators.

31. The method of claim 30, wherein receiving a set of candidate data records includes receiving a campaign identifier and wherein conditionally obtaining the second set of rules comprises:

searching in the database for a rule associated with the campaign identifier; and adding the rule to the second set of rules.

32. The method of claim 30, wherein receiving a set of candidate data records includes receiving a set of candidate data records from a proprietor associated with the information gathering system or from an internal batch process associated with the information gathering system.

33. The method of claim 30, further including receiving a threshold indicator, wherein each threshold indicator is indicative of a maximum tolerable difference between an expected result of applying a processing rule to the set of candidate data records and an actual result of applying a processing rule to the set of candidate data records.

34. The method of claim 31, further including obtaining the expected result of applying a processing rule to the set of candidate data from the information gathering system.

35. The method of claim 32, wherein obtaining the expected result of applying a processing rule to the set of candidate data from the information gathering system includes obtaining a historical average of applying the processing rule to sets of candidate data.

36. The method of claim 30, wherein receiving a set of candidate data records further includes receiving a campaign identifier; and wherein conditionally obtaining a second set of rules includes attempting to retrieve a set of rules associated with the campaign identifier.

37. A method of processing candidate data in an information gathering system, comprising:

obtaining a campaign set of processing rules associated with a first campaign from a merchant, wherein the campaign is associated with the merchant and the first campaign is associated with the first campaign identifier;

obtaining a first system set of processing rules from the information gathering system, wherein each processing rule in the first system set of processing rules defines a manner of individually processing a single record;

obtaining a second system set of processing rules from the information gathering system, wherein each processing rule in the second system set of processing rules defines a manner of processing a collection of data records;

obtaining a set of threshold values indicative of a tolerable error rate;

receiving a set of candidate data records;

receiving a campaign identifier associated with the set of candidate data records;

if the received campaign identifier matches the first campaign identifier:

applying the campaign set of processing rules to the set of candidate data records to produce a first set of quality indicators;

applying the first system set of processing rules to the set of candidate data records to produce a second set of quality indicators;

applying the second system set of processing rules to the set of candidate data records to produce a third set of quality indicators;

processing the first set of quality indicators, the second set of quality indicators, the third set of quality indicators, and the set of threshold values to divide the set of candidate data records into a first set, a second set, and a third set;

preventing the candidate data records in the first set from being applied to a database associated with the information gathering system;

applying the candidate data records in the second set to the database; and partially applying the candidate data records in the third set to the database, wherein at least one data field associated with a record in the third record is prevented from being applied to the database and at least one data field associated with a record in the third record is applied to the database.

\* \* \* \* \*